US010664999B2

(12) United States Patent
Gupta et al.

(10) Patent No.: US 10,664,999 B2
(45) Date of Patent: May 26, 2020

(54) SALIENCY PREDICTION FOR A MOBILE USER INTERFACE

(71) Applicant: Adobe Inc., San Jose, CA (US)

(72) Inventors: Prakhar Gupta, Bengaluru (IN); Sourav Pal, West Bengal (IN); Shubh Gupta, Delhi (IN); Ritwik Sinha, Bangalore (IN); Ajaykrishnan Jayagopal, Mumbai (IN)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 15/897,807

(22) Filed: Feb. 15, 2018

(65) Prior Publication Data
US 2019/0251707 A1    Aug. 15, 2019

(51) Int. Cl.
*G06T 9/00* (2006.01)
*G06T 3/40* (2006.01)
(Continued)

(52) U.S. Cl.
CPC .............. *G06T 9/002* (2013.01); *G06N 3/08* (2013.01); *G06T 3/40* (2013.01); *G06F 3/013* (2013.01);
(Continued)

(58) Field of Classification Search
CPC .. G06T 9/002; G06T 3/40; G06T 7/90; G06T 7/70; G06N 3/08
See application file for complete search history.

(56) References Cited

U.S. PATENT DOCUMENTS 6,108,635 A     8/2000  Herren et al.
10,346,524 B1 *  7/2019  Zheng ..................... G06N 3/08
(Continued)

FOREIGN PATENT DOCUMENTS

WO         2015058151 A2     4/2015

OTHER PUBLICATIONS

Shen "Learning to predict eye fixations for semantic contents using multi-layer sparse network" Neurocomputing 138 (Year: 2014).*
(Continued)

*Primary Examiner* — Mekonen T Bekele
*Assistant Examiner* — Molly Delaney
(74) *Attorney, Agent, or Firm* — Brake Huches Bellermann LLP

(57) ABSTRACT

A content saliency network is a machine-learned neural network that predicts the saliency of elements of a content item. The content saliency network may be used in a method that includes determining a set of elements in a UI and computing a first context vector for the content. The method may also include, for each element in the set of elements, computing a vector of simple features for the element, the simple features being computed from attributes of the element, computing a second context vector for the element, computing a third context vector for an intermediate context of the element, and providing the vectors to the content saliency network. The content saliency network provides a saliency score for the element. The method further includes generating an element-level saliency map of the content using the respective saliency scores for the set of elements and providing the saliency map to a requestor.

20 Claims, 10 Drawing Sheets

(51) Int. Cl.
  *G06N 3/08* (2006.01)
  *G06F 3/01* (2006.01)
  *G06T 7/90* (2017.01)
  *G06T 7/70* (2017.01)

(52) U.S. Cl.
  CPC ........ *G06T 7/70* (2017.01); *G06T 7/90* (2017.01); *G06T 2200/24* (2013.01); *G06T 2207/20081* (2013.01); *G06T 2207/20084* (2013.01)

(56) References Cited

U.S. PATENT DOCUMENTS

| | | |
|---|---|---|
| 2003/0105638 A1 | 6/2003 | Taira |
| 2005/0043614 A1 | 2/2005 | Huizenga et al. |
| 2007/0130206 A1 | 6/2007 | Zhou et al. |
| 2007/0208516 A1 | 9/2007 | Kutsyy |
| 2008/0201280 A1 | 8/2008 | Martin |
| 2009/0171871 A1 | 7/2009 | Zhang |
| 2009/0259459 A1 | 10/2009 | Ceusters et al. |
| 2009/0324126 A1 | 12/2009 | Zitnick et al. |
| 2010/0070448 A1 | 3/2010 | Omoigui |
| 2011/0026798 A1 | 2/2011 | Madabhushi |
| 2012/0278060 A1 | 11/2012 | Cancedda et al. |
| 2014/0126770 A1 | 5/2014 | Odessky |
| 2014/0365239 A1 | 12/2014 | Sadeghi |
| 2015/0154275 A1 | 6/2015 | Senart |
| 2015/0234921 A1 | 8/2015 | Li |
| 2015/0324527 A1 | 11/2015 | Siegel et al. |
| 2016/0203599 A1 | 7/2016 | Gillies |
| 2016/0314580 A1 | 10/2016 | Lloyd et al. |
| 2016/0364630 A1 | 12/2016 | Reicher et al. |
| 2017/0358079 A1 | 12/2017 | Gillies et al. |
| 2018/0068198 A1* | 3/2018 | Savvides ............ G06K 9/3233 |
| 2018/0240221 A1* | 8/2018 | Rijnders ............... G06T 5/10 |
| 2019/0065471 A1* | 2/2019 | Comeau ............ G06F 16/313 |
| 2019/0147288 A1* | 5/2019 | Gupta ................ G06N 3/0454 |
| | | 715/253 |

OTHER PUBLICATIONS

Shen, Chengyao, Mingli Song, and Qi Zhao "Learning high-level concepts by training deep network on eye fixations" NIPS Deep Learning and Unsup Feat Learn Workshops vol. 2 (Year: 2012).*

Han "Two-Stage Learning to predict Human Eye Fixations via SDAEs" IEE (Year: 2016).*

Juan, S., Stents overused to treat heart patients, in China Daily. 2012: Online, English Edition.

Karlof, E., Correlation of Computed Tomography with Carotid Plaque Transcriptomes Associates Calcification to Lesion-Stabilization (Abstract). 2018, Karolinska Institutet.

Katz, "Biomarkers and Surrogate Markers: An FDA Perspective." NeuroRx. 12(2004):189-195.

Kaul, S. and J. Narula, In search of the vulnerable plaque: is there any light at the end of the catheter? 2014, Journal of the American College of Cardiology.

Kawahara, I., et al., The detection of carotid plaque rupture caused by intraplaque hemorrhage by serial high-resolution magnetic resonance imaging: a case report. Surg Neurol, 2008. 70(6): p. 634-9; discussion 639.

Kawasaki, M., et al., Volumetric Quantitative Analysis of Tissue Characteristics of Coronary Plaques After Statin Therapy Using Three-Dimensional Integrated Backscatter Intravascular Ultrasound. J Am Coll Cardiol, 2005. 45(12): p. 1946-1953.

Kerwin et al. "MRI of Carotid Artherosclerosis." Am. J. Roentgenol. 200.(2013):W304-W313.

Kerwin, W., et al., Magnetic resonance imaging of carotid atherosclerosis: plaque analysis. Top Magn Reson Imaging, 2007. 18(5): p. 371-8.

Kerwin, W., et al., Quantitative Magnetic Resonance Imaging Analysis of Neovasculature Volume in Carotid Atherosclerotic Plaque. Circulation, 2003. 107(6): p. 851-856.

Kerwin, W.S., et al., Inflammation in carotid atherosclerotic plaque: a dynamic contrast-enhanced MR imaging study. Radiology, 2006. 241(2): p. 459-68.

Kerwin, W.S., et al., MR imaging of adventitial vasa vasorum in carotid atherosclerosis. Magnetic Resonance in Medicine, 2008. 59(3): p. 507-514.

Kerwin, W.S., et al., Signal features of the atherosclerotic plaque at 3.0 Tesla versus 1.5 Tesla: impact on automatic classification. J Magn Reson Imaging, 2008. 28(4): p. 987-95.

Khan et al., "Robust atlas-based brain segmentation using multi-structure confidence-weighted registration" Proceedings of the 12th International Conference on Medical Imaging Computing, Sep. 20, 2009.

Kholodenko, B.N., Cell-signalling dynamics in time and space. Nat Rev Mol Cell Biol, 2006. 7(3): p. 165-76.

Kim et al. "A Curve Evolution-based variational approach to Simultaneous Image Restoration and Segmentation." IEEE Int. Conf. Image Proc. (2002) 1-109.

Kini, A.S., et al., Changes in Plaque Lipid Content After Short-Term Intensive Versus Standard Statin Therapy. Journal of the American College of Cardiology, 2013. 62(1): p. 21-9.

Kishi, S., et al., Fractional Flow Reserve Estimated at Coronary CT Angiography in Intermediate Lesions: Comparison of Diagnostic Accuracy of Different Methods to Determine Coronary Flow Distribution. Radiology, 2018. 287(1): p. 76-84.

Kitagawa, T., et al., Characterization of Noncalcified Coronary Plaques and Identification of Culprit Lesions in Patients With Acute Coronary Syndrome by 64-Slice Computed Tomography. JACC: Cardiovascular Imaging, 2009. 2(2): p. 153-160.

Kohsaka, S. and A.N. Makaryus, Coronary angiography using noninvasive imaging techniques of cardiac CT and MRI. Current cardiology reviews, 2008. 4(4): p. 323.

Kolata, G., 'Unbelievable': Heart Stents Fail to Ease Chest Pain, in New York Times. 2017.

Kolossvary, M., et al., Radiomic Features Are Superior to Conventional Quantitative Computed Tomographic Metrics to Identify Coronary Plaques With Napkin-Ring Sign. Circ Cardiovasc Imaging, 2017. 10(12).

Koo, B.K., et al., Diagnosis of ischemia-causing coronary stenoses by noninvasive fractional flow reserve computed from coronary computed tomographic angiograms. Results from the prospective multicenter Discover-Flow (Diagnosis of Ischemia-Causing Stenoses Obtained Via Noninvasive Fractional Flow Reserve) study. J Am Coll Cardiol, 2011. 58(19): p. 1989-97.

Korn, E.L., P.S. Albert, and L.M. McShane, Assessing surrogates as trial endpoints using mixed models. Statistics in medicine, 2005. 24(2): p. 163-182.

Krizhevslcy, A., I. Sutskever, and G.E. Hinton. Imagenet classification with deep convolutional neural networks. in Advances in neural information processing systems. 2012.

Langlotz, C.P., Enhancing the Expressiveness of Structured Reporting Systems. J. Digit. Imaging, 2000. 13: p. 49-53.

Larose, E., et al., Characterization of Human Atherosclerotic Plaques by Intravascular Magnetic Resonance Imaging. Circulation, 2005. 112(15): p. 2324-2331.

Lathia et al. "The Value, Qualification, and Regulatory Use of Surrogate End Points in Drug Development." Clin. Pharmacol. Therapeutics. 86.1(2009):32-43.

Lavi, S., et al., Segmental coronary endothelial dysfunction in patients with minimal atherosclerosis is associated with necrotic core plaques. Heart, 2009. 95(18): p. 1525-1530.

Lavi, S., et al., The interaction between coronary endothelial dysfunction, local oxidative stress, and endogenous nitric oxide in humans. Hypertension, 2008. 51(1): p. 127-133.

Leber, A.W., et al., Quantification of Obstructive and Nonobstructive Coronary Lesions by 64-Slice Computed Tomography: A Comparative Study With Quantitative Coronary Angiography and Intravascular Ultrasound. J Am Coll Cardiol, 2005. 46(1): p. 147-154.

Levin DC, P.L., Halpern EJ, Rao VM, Coronary CT Angiography: Use in Patients With Chest Pain Presenting to Emergency Departments. American Journal of Roentgenology, 2018. 210(4): p. 4.

(56) References Cited

OTHER PUBLICATIONS

Li, D., Z.A. Fayad, and D.A. Bluemke, Can Contrast-Enhanced Cardiac Magnetic Resonance Assess Inflammation of the Coronary Wall? JACC: Cardiovascular Imaging, 2009. 2(5): p. 589-591.

Li, F., et al., Scan-rescan reproducibility of carotid atherosclerotic plaque morphology and tissue composition measurements using multicontrast MRI at 3T. J Magn Reson Imaging, 2010. 31(1): p. 168-76.

Li, T., et al., Classification of Human Coronary Atherosclerotic Plaques Using Ex Vivo High-Resolution Multicontrast-Weighted MRI Compared With Histopathology. American Journal of Roentgenology, 2012. 198(5): p. 1069-1075.

Lindsay, A.C., et al., Plaque Features Associated With Increased Cerebral Infarction After Minor Stroke and TIA: A Prospective, Case-Control, 3-T Carotid Artery MR Imaging Study. JACC: Cardiovascular Imaging, 2012. 5(4): p. 388-396.

Litt, H.I., et al., CT Angiography for Safe Discharge of Patients with Possible Acute Coronary Syndromes. N Engl J Med, 2012. 366(15): p. 1393-403.

Liu, F., et al., Assessment of therapy responses and prediction of survival in malignant pleural mesothelioma through computer-aided volumetric measurement on computed tomography scans. J Thorac Oncol, 2010. 5(6): p. 879-84.

Liu, F., et al., Automated in vivo segmentation of carotid plaque MRI with Morphology-Enhanced probability maps. Magn Reson Med, 2006. 55(3): p. 659-68.

Liu, R., et al., Noninvasive numerical simulation of coronary fractional flow reserve based on lattice Boltzmann method. Sheng wu yi xue gong cheng xue za zhi= Journal of biomedical engineering= Shengwu yixue gongchengxue zazhi, 2018. 35(3): p. 384-389.

Lobatto, M.E., et al., Multimodal Clinical Imaging to Longitudinally Assess a Nanomedical Anti-Inflammatory Treatment in Experimental Atherosclerosis. Molecular Pharmaceutics, 2010. 7(6): p. 2020-2029.

Ma, X., et al., Volumes Learned: It Takes More Than Size to "Size Up" Pulmonary Lesions. Acad Radiol, 2016. 23(9): p. 1190-8.

Mackey, R.H., L. Venkitachalam, and K. Sutton-Tyrrell, Calcifications, arterial stiffness and atherosclerosis. Adv Cardiol, 2007. 44: p. 234-44.

Magge, R., et al., Clinical Risk Factors and CT Imaging Features of Carotid Atherosclerotic Plaques as Predictors of New Incident Carotid Ischemic Stroke: A Retrospective Cohort Study. American Journal of Neuroradiology, 2013. 34(2): p. 402-409.

Maier, D., et al., Knowledge management for systems biology a general and visually driven framework applied to translational medicine. BMC Syst Biol, 2011. 5: p. 38.

Maintz, D., et al., Selective coronary artery plaque visualization and differentiation by contrast-enhanced inversion prepared MRI. Eur Heart J, 2006. 27(14): p. 1732-6.

Maitland, M.L., Volumes to learn: advancing therapeutics with innovative computed tomography image data analysis. Clin Cancer Res, 2010. 16(18): p. 4493-5.

Makowski, M.R. and R.M. Botnar, MR Imaging of the Arterial Vessel Wall: Molecular Imaging from Bench to Bedside. Radiology, 2013. 269(1): p. 34-51.

Makowski, M.R., et al., Characterization of coronary atherosclerosis by magnetic resonance imaging. Circulation, 2013. 128(11): p. 1244-55.

Maldonado, F., et al., Non-invasive Characterization of the Histopathologic Features of Pulmonary Nodules of the Lunt Adenocarcinoma Spectrum using Computer Aided Nodule Assessment and Risk Yield (CANARY)—a Pilot Study. Journal of thoracic oncology: official publication of the International Association for the Study of Lung Cancer, 2013. 8(4): p. 452.

Mani, V., et al., Predictors of change in carotid atherosclerotic plaque inflammation and burden as measured by 18-FDG-PET and MRI, respectively, in the dal-PLAQUE study. Int J Cardiovasc Imaging, 2014. 30(3): p. 571-582.

Cai, J.M., et al., Classification of human carotid atherosclerotic lesions with in vivo multicontrast magnetic resonance imaging. Circulation, 2002. 106(11): p. 1368-73.

Cappendijk, V.C., et al., Assessment of human atherosclerotic carotid plaque components with multisequence MR imaging: initial experience. Radiology, 2005. 234(2): p. 487-92.

Carter, H.H., et al., Evidence for Shear Stress-Mediated Dilation of the Internal Carotid Artery in Humans. Hypertension, 2016. 68(5): p. 1217-1224.

Caselles, V., R. Kimmel, and G. Sapiro, Geodesic Active Contours. International Journal on Computer Vision, 1997. 22(1): p. 61-97.

Castellano et al. "Texture analysis of medical images," Clinical Radiology, Dec. 1, 2004 (Dec. 1, 2004) vol. 59.

Chan et al. "Active Contours without Edges." IEEE Trans. Image Process. 10.2(2001):266-277.

Chang HJ, F.Y.L., et al. Coronary Atherosclerotic Precursors of Acute Coronary Syndromes. Journal of the American College of Cardiology (JACC), 2018. 71(22).

Chang, A.M., et al., Actual Financial Comparison of Four Strategies to Evaluate Patients with Potential Acute Coronary Syndromes. Academic Emergency Medicine, 2008. 15(7): p. 649-655.

Chinnaiyan, K.M., et al., Coronary computed tomography angiography after stress testing: results from a multicenter, statewide registry, ACIC (Advanced Cardiovascular Imaging Consortium). Journal of the American College of Cardiology, 2012. 59(7): p. 688-695.

Choi et al. "Multiscale image segmentation using wavelet-domain hidden Markov models" IEEE Trans Image Process, Sep. 1, 2001 (Sep. 1, 2001), vol. 10.

Ciccone, M.M., et al., Cardiovascular risk evaluation and prevalence of silent myocardial ischemia in subjects with asymptomatic carotid artery disease. Vasc Health Risk Manag, 2011. 7: p. 129-34.

Coenen, A., et al., Diagnostic accuracy of a machine-learning approach to coronary computed tomographic angiography-based fractional flow reserve: result from the Machine consortium. Circulation: Cardiovascular Imaging, 2018. 11(6): p. e007217.

Collobert, R., et al., Natural language processing (almost) from scratch. Journal of Machine Learning Research, Aug. 12, 2011: p. 2493-2537.

Davies, J.R., et al., Radionuclide Imaging for the Detection of Inflammation in Vulnerable Plaques. J Am Coll Cardiol, 2006. 47(8, Supplement): p. C57-C68.

de Bono, B., et al., The Open Physiology workflow: modeling processes over physiology circuitboards of interoperable tissue units. Front Physiol, 2015. 6: p. 24.

De Bruyne, B., et al., Fractional flow reserve-guided PCI for stable coronary artery disease. New England Journal of Medicine, 2014. 371(13): p. 1208-1217.

de Graaf, M., et al., Automatic quantification and characterization of coronary atherosclerosis with computed tomography coronary angiography: cross-correlation with intravascular ultrasound virtual histology. Int J Cardiovasc Imaging, 2013. 29(5): p. 1177-1190.

de Weed et al. "In Vivo Characterization and Quantification of Atherosclerotic Carotid Plaque Components with Multidetector Computed Tomography and Histopathological Correlation." Arterioscler. Thromb. Vasc. Biol. 26.10 (2006):2366-2372.

DeMarco, J.K. and J. Huston, Imaging of high-risk carotid artery plaques: current status and future directions. Neurosurgical Focus, 2014. 36(1): p. E1.

Depairon, M., Cardiovascular risk prediction with ultrasound. Cardiovascular Medicine, 2010. 13(9): p. 255-264.

Dey, D. and F. Commandeur, Radiomics to Identify High-Risk Atherosclerotic Plaque From Computed Tomography: The Power of Quantification. Circ Cardiovasc Imaging, 2017. 10(12).

Dey, D., et al., Automated 3-dimensional quantification of noncalcified and calcified coronary plaque from coronary CT angiography. Journal of Cardiovascular Computed Tomography, 2010. 3(6): p. 372-382.

Diaz-Zamudio, M., et al., Automated Quantitative Plaque Burden from Coronary CT Angiography Noninvasively Predicts Hemodynamic Significance by using Fractional Flow Reserve in Intermediate Coronary Lesions. Radiology, 2015. 276(2): p. 408-15.

(56) References Cited

OTHER PUBLICATIONS

Dodd, J.D., et al., Quantification of Nonculprit Coronary Lesions: Comparison of Cardiac 64-MDCT and Invasive Coronary Angiography. American Journal of Roentgenology, 2008. 191(2): p. 432-438.

Dong, L., et al., Carotid Artery Atherosclerosis: Effect of Intensive Lipid Therapy on the Vasa Vasorum—Evaluation by Using Dynamic Contrast-enhanced MR Imaging. Radiology, 2011. 260(1): p. 224-231.

Du, R., et al., Early decrease in carotid plaque lipid content as assessed by magnetic resonance imaging during treatment of rosuvastatin. BMC Cardiovascular Disorders, 2014. 14(1): p. 83.

Duivenvoorden, R., et al., In Vivo Quantification of Carotid Artery Wall Dimensions: 3.0-Tesla MRI Versus B-Mode Ultrasound Imaging. Circulation: Cardiovascular Imaging, 2009. 2(3): p. 235-242.

Ederle, J., et al., Carotid artery stenting compared with endarterectomy in patients with symptomatic carotid stenosis (International Carotid Stenting Study): an interim analysis of a randomised controlled trial. Lancet, 2010. 375(9719): p. 985-97.

Ernst, C.B., HeartFlow Announces Positive Medical Coverage Decisions on Non-Invasive HeartFlow® FFRct Analysis from Anthem Blue Cross Blue Shield, Blue Shield of California and Blue Cross and Blue Shield of Alabama. 2017, Heartflow Inc: Redwood City, Calif.

Esposito, L., et al., MRI plaque imaging reveals high-risk carotid plaques especially in diabetic patients irrespective of the degree of stenosis. BMC Medical Imaging, 2010. 10(1): p. 27.

Esposito-Bauer, L., et al., MRI Plaque Imaging Detects Carotid Plaques with a High Risk for Future Cerebrovascular Events in Asymptomatic Patients. PLoS One, 2013. 8(7): p. e67927.

F D Kolodgie, R.V., A P Burke, A Farb, D K Weber, R Kutys, A V Finn, H K Gold, Pathologic assessment of the vulnerable human coronary plaque. Heart, 2004. 90.

Fayad, Z.A., et al., Magnetic Resonance Imaging of Atherosclerotic Plaque, I.P. WO/2005/079274, Editor, May 9, 2005.

Ferencik, M., et al., Use of High-Risk Coronary Atherosclerotic Plaque Detection for Risk Stratification of Patients With Stable Chest Pain: A Secondary Analysis of the Promise Randomized Clinical Trial. JAMA Cardiol, 2018. 3(2): p. 144-152.

Filardi, V., Carotid artery stenosis near a bifurcation investigated by fluid dynamic analyses. The neuroradiology journal, 2013. 26(4): p. 439-453.

Fleming, T.R. and D.L. DeMets, Surrogate end points in clinical trials: are we being misled? Ann Intern Med, 1996. 125(7): p. 605-13.

Fleming. "Surrogate Endpoints and FDA's Accelerated Approval Process." Health Affairs. 24.1(2005):67-78.

Freedman et al. "Statistical Validation of Intermediate Endpoints for Chronic Diseases." Stat. Med. 11(1992):167-178.

Freimuth, R.R., et al., Life sciences domain analysis model. J Am Med Inform Assoc, 2012. 19(6): p. 1095-102.

Fuchs, T., et al., Coronary artery calcium quantification from contrast enhanced CT using gemstone spectral imaging and material decomposition. Int J Cardiovasc Imaging, 2014. 30(7): p. 1399-1405.

Fujimoto, S., et al., A novel method for non-invasive plaque morphology analysis by coronary computed tomography angiography. Int J Cardiovasc Imaging, 2014. 30(7): p. 1373-1382.

Fuleihan et al. "Reproducibility of DXA Absorptiometry: A Model for , , Bone Loss Estimates." J. Bone Miner. Res. 10.74(1995):1004-1014.

Fuster, V. and P.R. Moreno, Atherothrombosis as a systemic, often silent, disease. Nat Clin Pract Cardiovasc Med, 2005. 2(9): p. 431.

Gao, T., Z. Zhang, and W. Yu, Atherosclerotic Carotid Vulnerable Plaque and Subsequent Stroke: A High-Resolution MRI Study. Atherosclerotic Carotid Vulnerable Plaque and Subsequent Stroke: A High-Resolution MRI Study, 2009. 27: p. 345-352.

Garcia-Garcia, H.M., M.A. Costa, and P.W. Serruys, Imaging of coronary atherosclerosis: intravascular ultrasound. Eur Heart J, 2010. 31(20): p. 2456-69.

Gaston A. Rodriguez-Granillo1, Patricia Carrascosa1, Nico Bruining3, and a.H.M.G.-G. RonWaksman4, Defining the non-vulnerable and vulnerable patients with computed tomography coronary angiography: evaluation of atherosclerotic plaque burden and composition. European Heart Journal—Cardiovascular Imaging, 2016. 2016(17): p. 481-491.

Gerretsen, S., et al., Detection of coronary plaques using MR coronary vessel wall imaging: validation of findings with intravascular ultrasound. European radiology, 2013. 23(1): p. 115-124.

Gerretsen, S.C., et al., Visualization of Coronary Wall Atherosclerosis in Asymptomatic Subjects and Patients with Coronary Artery Disease Using Magnetic Resonance Imaging. PLoS One, 2010. 5(9): p. e12998.

Gevaert, O., et al., Non-small cell lung cancer: identifying prognostic imaging biomarkers by leveraging public gene expression microarray data—methods and preliminary results. Radiology, 2012. 264(2): p. 387-396.

Ghazalpour, A., et al., Thematic review series: The pathogenesis of atherosclerosis. Toward a biological network for atherosclerosis. J Lipid Res, 2004. 45(10): p. 1793-805.

Prescott, J., Quantitative Imaging Biomarkers: The Application of Advanced Image Processing and Analysis to Clinical and Preclinical Decision Making. Journal of Digital Imaging, 2013. 26(1): p. 97-108.

Reddy et al. "Confidence guided enhancing brain tumor segmentation in multi-parametric MRI" Proceedings of the 12th International Conference on Medical Image Computing and Computer-Assisted Intervention, MICCAI 2009, held in London, UK, Sep. 20, 2009.

Saba, L., et al., Carotid Artery Plaque Characterization Using CT Multienergy Imaging. American Journal of Neuroradiology, 2013. 34(4): p. 855-859.

Sadot, A., et al., Toward verified biological models. IEEE/ACM Trans Comput Biol Bioinform, 2008. 5(2): p. 223-34.

Sargent, D., et al., Validation of novel imaging methodologies for use as cancer clinical trial end-points. European Journal of Cancer, 2009. 45(2): p. 290-299.

Stary, H.C., et al., A definition of advanced types of atherosclerotic lesions and a histological classification of atherosclerosis a report from the Committee on Vascular Lesions of the Council on Arteriosclerosis, American Heart Association. Circulation, 1995. 92(5): p. 1355-1374.

Stary, H.C., Natural history and histological classification of atherosclerotic lesions: an update. Arterioscler Thromb Vasc Biol, 2000. 20(5): p. 1177-8.

van 't Klooster, R., et al., Visualization of Local Changes in Vessel Wall Morphology and Plaque Progression in Serial Carotid Artery Magnetic Resonance Imaging. Stroke, 2014. 45(8): p. e160-e163.

Virmani, R., et al., Pathology of the Vulnerable Plaque. JACC, 2006. 47(8): p. C13-8.

Voros, S., et al., Coronary Atherosclerosis Imaging by Coronary CT Angiography. JACC Cardiovasc Imaging, 2011. 4(5): p 537-48.

William B. Kerr et al. "A Methodology and Metric for Quantitative Analysis and Parameter Optimization of Unsupervised, Multi-Region Image Segmentation", Proceeding of the 8th IASTED International Conference on Signal and Image Processing, Aug. 14, 2006, pp. 243-248.

Zavodni, A.E.H., et al., Carotid Artery Plaque Morphology and Composition in Relation to Incident Cardiovascular Events: The Multi-Ethnic Study of Atherosclerosis (MESA). Radiology, 2014. 271(2): p. 381-389.

Mannelli, L., et al., Changes in measured size of atherosclerotic plaque calcifications in dual-energy CT of ex vivo carotid endarterectomy specimens: effect of monochromatic keV image reconstructions. European radiology, 2013. 23(2): p. 367-374.

Marwick TH, C.I., Hartaigh B, Min JK, Finding the Gatekeeper to the Cardiac Catheterization Laboratory Coronary CT Angiography or Stress Testing? Journal of the American College of Cardiology (JACC), 2015. 65(25): p. 10.

May, J.M., et al., Low-Risk Patients With Chest Pain in the Emergency Department: Negative 64-MDCT Coronary Angiography May Reduce Length of Stay and Hospital Charges. American Journal of Roentgenology, 2009. 193(1): p. 150-154.

(56) References Cited

OTHER PUBLICATIONS

Meijboom, W.B., et al., Comprehensive assessment of coronary artery stenoses: computed tomography coronary angiography versus conventional coronary angiography and correlation with fractional flow reserve in patients with stable angina. Journal of the American College of Cardiology, 2008. 52(8): p. 636-643.
Melander, O., et al., Novel and conventional biomarkers for prediction of incident cardiovascular events in the community. JAMA : the journal of the American Medical Association, 2009. 302(1): p. 49-57.
Melikian, N., et al., Fractional flow reserve and myocardial perfusion imaging in patients with angiographic multivessel coronary artery disease. JACC: Cardiovascular Interventions, 2010. 3(3): p. 307-314.
Miao, C., et al., Positive Remodeling of the Coronary Arteries Detected by Magnetic Resonance Imaging in an Asymptomatic Population: MESA (Multi-Ethnic Study of Atherosclerosis). J Am Coll Cardiol, 2009. 53(18): p. 1708-1715.
Miao, C., et al., The Association of Pericardial Fat with Coronary Artery Plaque Index at MR Imaging: The Multi-Ethnic Study of Atherosclerosis (MESA). Radiology, 2011. 261(1): p. 109-115.
Min, J.K., et al., Diagnostic accuracy of fractional flow reserve from anatomic CT angiography. JAMA, 2012. 308(12): p. 1237-45.
Min, J.K., Y. Chandrashekhar, and J. Narula, Noninvasive FFR After STEMI Looking for the Guilty Bystander. JACC Cardiovasc Imaging, 2017. 10(4): p. 500-502.
Min, J.K., Y. Chandrashekhar, and J. Narula, The Immediate Effects of Statins on Coronary Atherosclerosis: Can Phenotype Explain Outcome? JACC Cardiovasc Imaging, 2017.
Mono, M.L., et al., Plaque Characteristics of Asymptomatic Carotid Stenosis and Risk of Stroke. Cerebrovascular Diseases, 2012. 34(5-6): p. 343-350.
Moschetti, K., et al., Comparative cost-effectiveness analyses of cardiovascular magnetic resonance and coronary angiography combined with fractional flow reserve for the diagnosis of coronary artery disease. Journal of Cardiovascular Magnetic Resonance, 2014. 16(1): p. 13.
Moss AJ, W.M., Newby DE, Nicol ED, The Updated NICE Guidelines: Cardiac CT as the First-Line Test for Coronary Artery Disease. Curr Cardiovasc Imaging Rep., 2017. 10(5): p. 5.
Motoyama, S., et al., Computed tomographic angiography characteristics of atherosclerotic plaques subsequently resulting in acute coronary syndrome. Journal of the American College of Cardiology, 2009. 54(1): p. 49-57.
Motoyama, S., et al., Morphologic and Functional Assessment of Coronary Artery Disease; Potential Application of Computed Tomography Angiography and Myocardial Perfusion Imaging. Circulation Journal, 2013. 77(2): p. 411-417.
Motoyama, S., et al., Multislice computed tomographic characteristics of coronary lesions in acute coronary syndromes. J Am Coll Cardiol, 2007. 50(4): p. 319-26.
Motoyama, S., et al., Plaque characterization by coronary computed tomography angiography and the likelihood of acute coronary events in mid-term follow-up. Journal of the American College of Cardiology, 2015. 66(4): p. 337-346.
Mozley et al. "Change in Lung Tumor Volume as a Biomarker of Treatment Response: A Critical Review of the Evidence." Ann. Oncol. 21.9(2010):1751-1755.
Muntendam, P., et al., The BioImage Study: Novel approaches to risk assessment in the primary prevention of atherosclerotic cardiovascular disease—study design and objectives. Am Heart J, 2010. 160(1): p. 49-57.e1.
Nair, A., et al., Coronary Plaque Classification With Intravascular Ultrasound Radiofrequency Data Analysis. Circulation, 2002. 106(17): p. 2200-2206.
Nakanishi, R. and M.J. Budoff, Noninvasive FFR derived from coronary CT angiography in the management of coronary artery disease: technology and clinical update. Vascular health and risk management, 2016. 12: p. 269.
Narula, J., et al., Histopathologic characteristics of atherosclerotic coronary disease and implications of the findings for the invasive and noninvasive detection of vulnerable plaques. Journal of the American College of Cardiology, 2013. 61(10): p. 1041-1051.
Naylor, A.R., Identifying the high-risk carotid plaque. The Journal of Cardiovascular Surgery, 2014. 55(2): p. 11-20.
Nissen, S.E., The Vulnerable Plaque "Hypothesis": Promise, but Little Progress. JACC: Cardiovascular Imaging, 2009. 2(4): p. 483-485.
Nørgaard, B.L., et al., Diagnostic performance of noninvasive fractional flow reserve derived from coronary computed tomography angiography in suspected coronary artery disease: the NXT trial (Analysis of Coronary Blood Flow Using CT Angiography: Next Steps). J Am Coll Cardiol, 2014. 63(12): p. 1145-1155.
Obaid, D.R., et al., Atherosclerotic Plaque Composition and Classification Identified by Coronary Computed Tomography: Assessment of Computed Tomography-Generated Plaque Maps Compared With Virtual Histology Intravascular Ultrasound and Histology. Circulation: Cardiovascular Imaging, 2013: p. 655-664.
Obaid, D.R., et al., Dual-energy computed tomography imaging to determine atherosclerotic plaque composition: A prospective study with tissue validation. Journal of Cardiovascular Computed Tomography, 2014. 8(3): p. 230-237.
Obaid, D.R., et al., Identification of Coronary Plaque Sub-Types Using Virtual Histology Intravascular Ultrasound is Affected by Inter-Observer Variability and Differences in Plaque Definitions. Circulation: Cardiovascular Imaging, 2012. 5(1): p. 86-93.
Oberoi, S., et al., Reproducibility of Noncalcified Coronary Artery Plaque Burden Quantification From Coronary CT Angiography Across Different Image Analysis Platforms. American Journal of Roentgenology, 2013. 202(1): p. W43-W49.
Oikawa, M., et al., Carotid magnetic resonance imaging. A window to study atherosclerosis and identify high-risk plaques. Circ J, 2009. 73(10): p. 1765-73.
Okubo, M., et al., Tissue Characterization of Coronary Plaques : Comparison of Integrated Backscatter Intravascular Ultrasound With Virtual Histology Intravascular Ultrasound. Circ J, 2008. 72(10): p. 1631-1639.
Ota, H., et al., Carotid intraplaque hemorrhage imaging at 3.0-T MR imaging: comparison of the diagnostic performance of three T1-weighted sequences. Radiology, 2010. 254(2): p. 551-63.
Ota, H., et al., Hemorrhage and large lipid-rich necrotic cores are independently associated with thin or ruptured fibrous caps: an in vivo 3T MRI study. Arterioscler Thromb Vasc Biol, 2009. 29(10): p. 1696-701.
Pandya, A., et al., Carotid Artery Stenosis: Cost-effectiveness of Assessment of Cerebrovascular Reserve to Guide Treatment of Asymptomatic Patients. Radiology, 2014. 274(2): p. 455-463.
Park, S.-J., et al., Visual-functional mismatch between coronary angiography and fractional flow reserve. JACC: Cardiovascular Interventions, 2012. 5(10): p. 1029-1036.
Parmar, J.P., et al., Magnetic Resonance Imaging of Carotid Atherosclerotic Plaque in Clinically Suspected Acute Transient Ischemic Attack and Acute Ischemic Stroke. Circulation, 2010. 122(20): p. 2031-2038.
Pearson, T.A., et al., Markers of Inflammation and Cardiovascular Disease: Application to Clinical and Public Health Practice: A Statement for Healthcare Professionals From the Centers for Disease Control and Prevention and the American Heart Association. Circulation, 2003. 107(3): p. 499-511.
Perera, R. and P. Nand, Recent Advances in Natural Language Generation: A Survey and Classification of the Empirical Literature. vol. 36. 2017. 1-31.
Perisic, L.M. and U. Hedin, Unstable Plaque: from patient to molecule to patient, in Cardiology. 2018, Karolinska Institutet: HLF Stora Forskningsanlaget.
Phinikaridou et al. "Regions of Low Endothelial Shear Stress Colocalize with Positive Vascular Remodeling and Atherosclerotic Plaque Disruption: An in vivo Magnetic Resonance Imaging Study." Circ. Cardiovasc. Imaging. 6.2 (2013):302-310.
Pijils, N.H.J., B. de Bruyne, K. Peels, P.H. van der Voort, H.J.R.M. Bonnier, J. Bartunek, and J.J. Koolen, Measurement of Fractional

(56) References Cited

OTHER PUBLICATIONS

Flow Reserve to Assess the Functional Severity of Coronary-Artery Stenoses. New England Journal of Medicine, 1996. 334(26): p. 1703-1708.
Pijls, N.H., et al., Fractional flow reserve versus angiography for guiding percutaneous coronary intervention in patients with multivessel coronary artery disease: 2-year follow-up of the FAME (Fractional Flow Reserve Versus Angiography for Multivessel Evaluation) study. Journal of the American College of Cardiology, 2010. 56(3): p. 177-184.
Pijls, N.H., et al., Percutaneous Coronary Intervention of Functionally Nonsignificant Stenosis 5-Year Follow-Up of the DEFER Study. JACC, 2007. 49(21): p. 2105-11.
Polak, J.F., et al., Carotid artery plaque and progression of coronary artery calcium: the multi-ethnic study of atherosclerosis. J Am Soc Echocardiogr, 2013. 26(5): p. 548-55.
Polonsky, T.S., et al., Coronary artery calcium score and risk classification for coronary heart disease prediction. JAMA, 2010. 303(16): p. 1610-1616.
Prentice, "Surrogate Endpoints in Clinical Trials: Definition and Operational Criteria." Stat. Med. 9(1989):431-440.
Puchner, S.B., et al., High-Risk Plaque Detected on Coronary CT Angiography Predicts Acute Coronary Syndromes Independent of Significant Stenosis in Acute Chest Pain: Results From the ROMICAT-II Trial. J Am Coll Cardiol, 2014. 64(7): p. 684-692.
Puntmann, V.O., How-to guide on biomarkers: biomarker definitions, validation and applications with examples from cardiovascular disease. Postgraduate Medical Journal, 2009. 85(1008): p. 538-545.
Achenbach, S., et al., Assessment of coronary remodeling in stenotic and nonstenotic coronary atherosclerotic lesions by multidetector spiral computed tomography. J Am Coll Cardiol, 2004. 43(5): p. 842-847.
Achenbach, S., et al., Detection of Calcified and Noncalcified Coronary Atherosclerotic Plaque by Contrast-Enhanced, Submillimeter Multidetector Spiral Computed Tomography: A Segment-Based Comparison With Intravascular Ultrasound. Circulation, 2004. 109(1): p. 14-17.
Aerts, H.J.W.L., et al., Decoding tumour phenotype by noninvasive imaging using a quantitative radiomics approach. Nat Commun, 2014.
Agner, S., Xu, J, Madabhushi, A Spectral Embedding based Active Contour (SEAC): Applications to DCE MRI, in SPIE Medical Imaging. 2011, SPIE. p. In Press.
Agner, S.C., et al., Textural Kinetics: A Novel Dynamic Contrast-Enhanced (DCE)—MRI Feature for Breast Lesion Classification. Journal of Digital Imaging, 2010.
Ahmadi, A., A. Kini, and J. Narula, Discordance between ischemia and stenosis, or PINSS and NIPSS: are we ready for new vocabulary? 2015, JACC: Cardiovascular Imaging.
Ahmadi, A., et al., Association of Coronary Stenosis and Plaque Morphology With Fractional Flow Reserve and Outcomes. JAMA Cardiol, 2016. 1(3): p. 350-7.
Ahmadi, A., et al., Do plaques rapidly progress prior to myocardial infarction? The interplay between plaque vulnerability and progression. Circulation research, 2015. 117(1): p. 99-104.
Ahmadi, A., et al., Lesion-Specific and Vessel-Related Determinants of Fractional Flow Reserve Beyond Coronary Artery Stenosis. JACC Cardiovasc Imaging, 2018. 11(4): p. 521-530.
Albuquerque, L.C., et al., Intraplaque hemorrhage assessed by high-resolution magnetic resonance imaging and C-reactive protein in carotid atherosclerosis. Journal of Vascular Surgery, 2007. 46(6): p. 1130-1137.
Alic, L., W.J. Niessen, and J.F. Veenland, Quantification of heterogeneity as a biomarker in tumor imaging: a systematic review. PloS one, 2014. 9(10): p. e110300.
Alimohammadi, M., et al., Development of a Patient-Specific Multi-Scale Model to Understand Atherosclerosis and Calcification Locations: Comparison with in vivo Data in an Aortic Dissection. Front Physiol, 2016. 7: p. 238.

Altaf, N., et al., Detection of intraplaque hemorrhage by magnetic resonance imaging in symptomatic patients with mild to moderate carotid stenosis predicts recurrent neurological events. Journal of Vascular Surgery, 2008. 47(2): p. 337-342.
Altorki, N., et al., Phase II proof-of-concept study of pazopanib monotherapy in treatment-naive patients with stage I/II resectable non-small-cell lung cancer. J Clin Oncol, 2010. 28(19): p. 3131-7.
Anderson, J.D., et al., Multifactorial Determinants of Functional Capacity in Peripheral Arterial Disease: Uncoupling of Calf Muscle Perfusion and Metabolism. J Am Coll Cardiol, 2009. 54(7): p. 628-635.
Aoki, T., et al., Peripheral Lung Adenocarcinoma: Correlation of Thin-Section CT Findings with Histologic Prognostic Factors and Survival 1. Radiology, 2001. 220(3): p. 803-809.
Ariff et al. "Carotid Artery Hemodynamics: Observing Patient-specific Changes with Amlodipine and Lisinopril by Using MRI Imaging Computation Fluid Dynamics." Radiol. 257.3(2010):662-669.
Astor, B.C., et al., Remodeling of Carotid Arteries Detected with MR Imaging: Atherosclerosis Risk in Communities Carotid MRI Study. Radiology, 2010. 256(3): p. 879-886.
Atkinson, A.J., et al., Biomarkers and surrogate endpoints: Preferred definitions and conceptual framework*. Clinical Pharmacology & Therapeutics, 2001. 69(3): p. 89-95.
Awai, K., et al., Pulmonary Nodules: Estimation of Malignancy at Thin-Section Helical CT—Effect of Computer-aided Diagnosis on Performance of Radiologists 1. Radiology, 2006. 239(1): p. 276-284.
Bar, L., N. Sochen, and N. Kiryati, Semi-blind image restoration via Mumford-Shah regularization. IEEE Trans Image Process, 2006. 15(2): p. 483-93.
Barnett, H.J., et al., Benefit of carotid endarterectomy in patients with symptomatic moderate or severe stenosis. North American Symptomatic Carotid Endarterectomy Trial Collaborators. N Engl J Med, 1998. 339(20): p. 1415-25.
Bartlett, E.S., et al., Quantification of Carotid Stenosis on CT Angiography. American Journal of Neuroradiology, 2006. 27(1): p. 13-19.
Behnke, L., Solis A, Schulman SA, Skoufalos A, A Targeted Approach to Reducing Overutilization: Use of Percutaneous Coronary Intervention in Stable Coronary Artery Disease. Population Health Management, 2013. 16(3).
Bishop, C. and C.M. Bishop, Neural networks for pattern recognition. 1995: Oxford university press.
Bittencourt, M.S., et al., Prognostic Value of Nonobstructive and Obstructive Coronary Artery Disease Detected by Coronary Computed Tomography Angiography to Identify Cardiovascular Events. Circulation: Cardiovascular Imaging, 2014. 7(2): p. 282-291.
Bluemke, D.A., et al., Noninvasive Coronary Artery Imaging: Magnetic Resonance Angiography and Multidetector Computed Tomography Angiography: A Scientific Statement From the American Heart Association Committee on Cardiovascular Imaging and Intervention of the Council on Cardiovascular Radiology and Intervention, and the Councils on Clinical Cardiology and Cardiovascular Disease in the Young. Circulation, 2008. 118(5): p. 586-606.
Bochem, A.E., et al., ABCA1 mutation carriers with low high-density lipoprotein cholesterol are characterized by a larger atherosclerotic burden. Eur Heart J, 2012.
Boogers, M.J., et al., Automated quantification of coronary plaque with computed tomography: comparison with intravascular ultrasound using a dedicated registration algorithm for fusion-based quantification. Eur Heart J, 2012. 33(8): p. 1007-1016.
Boogers, M.J., et al., Automated Quantification of Stenosis Severity on 64-Slice CT: A Comparison With Quantitative Coronary Angiography. JACC: Cardiovascular Imaging, 2010. 3(7): p. 699-709.
Bourque et al. "Usefulness of Cardiovascular Magnetic Resonance Imaging of the Superficial Femoral Artery for Screening Patients with Diabetes Mellitus for Artherosclerosis." Am. J. Cardiol. 110. 1(2012):50-5.
Bradley, S.M., et al., Normal Coronary Rates for Elective Angiography in the Veterans Affairs Healthcare System: Insights From the VA

(56) References Cited

OTHER PUBLICATIONS

CART Program (Veterans Affairs Clinical Assessment Reporting and Tracking). J Am Coll Cardiol, 2014. 63(5): p. 417-426.
Brandman, S. and J.P. Ko, Pulmonary nodule detection, characterization, and management with multidetector computed tomography. Journal of Thoracic Imaging, 2011. 26(2): p. 90-105.
Brodoefel, H., et al., Accuracy of dual-source CT in the characterisation of non-calcified plaque: use of a colour-coded analysis compared with virtual histology intravascular ultrasound. The British Journal of Radiology, 2009. 82(982): p. 805-812.
Brodoefel, H., et al., Characterization of coronary atherosclerosis by dual-source computed tomography and HU-based color mapping: a pilot study. European radiology, 2008. 18(11): p. 2466-2474.
Brott, T.G., et al., 2011 ASA/ACCF/AHA/AANN/AANS/ACR/ASNR/CNS/SAIP/SCAI/SIR/SNIS/SVM/SVS Guideline on the Management of Patients With Extracranial Carotid and Vertebral Artery Disease. Circulation, 2011. 124: p. e54-e130.
Brott, T.G., et al., Long-Term Results of Stenting versus Endarterectomy for Carotid-Artery Stenosis. N Engl J Med, 2016. 374(11): p. 1021-31.
Buckler et al. "A Collaborative Enterprise for Multi-Stakeholder Participation in the Advancement of Quantitative Imaging." Radiol. 258.3(2011):906-914.
Buckler et al. "Data Sets for the Qualification of CT as a Quantitative Imaging Biomarker in Lung Cancer." Optics Exp. 18.14(2010):16.
Buckler et al. "Data Sets for the Qualification of Volumetric CT as a Quantitative Imaging Biomarker in Lung Cancer." Optics Exp. 18.14(2010):15267-15282.
Buckler et al. "Quantitative Imaging Test Approval and Biomarker Qualification: Interrelated but Distinct Activities." Radiol. 259.3(2011):875-884.
Buckler et al. "Standardization of Quantitative Imaging: The Time is Right and 18F-FDG PET/CT is a Good Place to Start." J. Nuclear Med. 52.2(2011):171-172.
Buckler et al. "The Use of Volumetric CT as an Imaging Biomarker in Lung Cancer." Acadmic Radiol. 17.1 (2010):100-106.
Buckler et al. "Volumetric CT in Lung Cancer: An Example for the Qualification of Imaging as a Biomarker." Academic Radiol. 17.1(2010):107-115.
Buckler, A., et al., A Novel Knowledge Representation Framework for the Statistical Validation of Quantitative Imaging Biomarkers. Journal of Digital Imaging, 2013. 26(4): p. 614-629.
Buckler, A.J., et al., Quantitative imaging biomarker ontology (QIBO) for knowledge representation of biomedical imaging biomarkers. Journal of digital imaging : the official journal of the Society for Computer Applications in Radiology, 2013. 26(4): p. 630-41.
Burzykowski, T., et al., Evaluation of tumor response, disease control, progression-free survival, and time to progression as potential surrogate end points in metastatic breast cancer. J Clin Oncol, 2008. 26(12): p. 1987-92.
Buyse et al. "The Validation of Surrogate Endpoints in Meta-Analysis of Randomized Experiments." Biostat. 1(2000):1-19.
Buyse, M., et al., Statistical validation of surrogate endpoints: problems and proposals. Drug Information Journal, 2000, 34(2): p. 447-454.
Cai, J., et al., In vivo quantitative measurement of intact fibrous cap and lipid-rich necrotic core size in atherosclerotic carotid plaque: comparison of high-resolution, contrast-enhanced magnetic resonance imaging and histology. Circulation, 2005. 112(22): p. 3437-44.
Bourque et al. "Usefulness of Cardiovascular Magnetic Resonance Imaging of the Superficial Femoral Artery for Screening Patients with Diabetes Mellitus for Artherosclerosis." Am. J. Cardiol. 110.1(2012):50-56.
Horie et al. "Assessment of Carotid Plaque Stability Based on Dynamic Enhancement Pattern in Plaque Components with Multidetector CT Angiography." Stroke. 43.2(2012):393-398.
Irace et al. "Human Common Carotid Wall Shear Stress as a Function of Age and Gender: A 12-year Follow-up Study." Age. 34.6(2012):1553-1562.
Jaffe, "Measures of Response: RECIST, WHO, and New Alternatives." J. Clin. Oncol. 24.20(2006):3245-3251.
Kerwin et al. "MRI of Carotid Artheroscleroris." Am. J. Roentgenol. 200.3(2013):W304-W313.
Sui et al. "Assessment of Wall Shear Stress in the Common Carotid Artery of Healthy Subjects Using 3.0-Tesla Magentic Resonanance." Acta Radiologica. 49.4(2008):442-449.
ten Kate et al. "Noninvasive Imaging of the Vulnerable Atherosclerotic Plaque." Current Problems Cardiol. 35.11(2010):556-591.
Van Klavern et al. "Management of Lung Nodules Detected by Volume CT Scanning." New Engl. J. Med. 361(2009):23.
Varma et al. "Coronary Vessel Wall Contrast Enhancement Imaging as a Potential Direct Marker of Coronary Involvement: Integration of Findings from CAD and SLE Patients." JACC Cardiovasc. Imaging. 7.8(2014):762-770.
Wintermark et al. "Carotid Plaque CT Imaging in Stroke and Non-Stroke Patients." Ann. Neurol. 64.2(2008):149-157.
Wintermark et al. "High-Resolution CT Imaging of Carotid Artery Atherosclerotic Plaques." Am. J. Neuroradiol. 29.5(2008):875-882.
Wong et al. "Imaging in Drug Discovery, Preclinical, and Early Clinical Development." J. Nuclear Med. 49.6(2008):26N-28N.
Woodcock et al. "The FDA Critical Path Initiative and its Influence on New Drug Development." Annu. Rev. Med. 59(2008):1-12.
Zhao et al. "Evaluating Variability in Tumor Measurements from Same-Day Repeat CT Scans of Patients with Non-Small Cell Lung Cancer." Radiol. 252.1(2009):263-272.
Pyxaras, S.A., et al., Quantitative angiography and optical coherence tomography for the functional assessment of nonobstructive coronary stenoses: Comparison with fractional flow reserve. Am Heart J, 2013. 166(6): p. 1010-1018. e1.
Qiao, Y., et al., Carotid Plaque Neovascularization and Hemorrhage Detected by MR Imaging are Associated with Recent Cerebrovascular Ischemic Events. American Journal of Neuroradiology, 2012. 33(4): p. 755-760.
Qiao, Y., et al., Identification of atherosclerotic lipid deposits by diffusion-weighted imaging. Arterioscler Thromb Vasc Biol, 2007. 27(6): p. 1440-6.
Räber, L., et al., Effect of high-intensity statin therapy on atherosclerosis in non-infarct-related coronary arteries (IBIS-4): a serial intravascular ultrasonography study. Eur Heart J, 2014.
Raff, G.L., et al., Diagnostic Accuracy of Noninvasive Coronary Angiography Using 64-Slice Spiral Computed Tomography. J Am Coll Cardiol, 2005. 46(3): p. 552-557.
Rinehart, S., et al., Quantitative measurements of coronary arterial stenosis, plaque geometry, and composition are highly reproducible with a standardized coronary arterial computed tomographic approach in high-quality CT datasets. Journal of Cardiovascular Computed Tomography, 2011. 5(1): p. 35-43.
Roes, S.D., et al., Aortic vessel wall magnetic resonance imaging at 3.0 Tesla: A reproducibility study of respiratory navigator gated free-breathing 3D black blood magnetic resonance imaging. Magnetic Resonance in Medicine, 2009. 61(1): p. 35-44.
Saam, T., et al., The vulnerable, or high-risk, atherosclerotic plaque: noninvasive MR imaging for characterization and assessment. Radiology, 2007. 244(1): p. 64-77.
Sakuma, H., Coronary CT versus MR Angiography: The Role of MR Angiography. Radiology, 2011. 258(2): p. 340-349.
Salem, M.K., et al., Identification of Patients with a Histologically Unstable Carotid Plaque Using Ultrasonic Plaque Image Analysis. European Journal of Vascular and Endovascular Surgery, 2014. 48(2): p. 118-125.
Sanak, D., et al., The role of magnetic resonance imaging for acute ischemic stroke. Biomed Pap Med Fac Univ Palacky Olomouc Czech Repub, 2009. 153(3): p. 181-7.
Sargent et al. "Validation of Novel Imaging Methodologies for Use as Cancer Clinical Trial End-points." Eur. J. Dis. 45(2009):290-299.
Saur, S.C., et al., Contrast enhancement with dual energy CT for the assessment of atherosclerosis, in Bildverarbeitung für die Medizin 2009. 2009, Springer. p. 61-65.

(56) References Cited

OTHER PUBLICATIONS

Schaar, J.A., et al., Terminology for high-risk and vulnerable coronary artery plaques. Report of a meeting on the vulnerable plaque, Jun. 17 and 18, 2003, Santorini, Greece. Eur Heart J, 2004. 25(12): p. 1077-82.
Schepis, T., et al., Quantification of non-calcified coronary atherosclerotic plaques with dual-source computed tomography: comparison with intravascular ultrasound. Heart, 2010. 96(8): p. 610-615.
Schneeweis, C., et al., Delayed Contrast-Enhanced MRI of the Coronary Artery Wall in Takayasu Arteritis. PLoS One, 2012. 7(12): p. e50655.
Schuetz, G.M., et al., Meta-analysis: Noninvasive Coronary Angiography Using Computed Tomography Versus Magnetic Resonance Imaging. Ann Intern Med, 2010. 152(3): p. 167-177.
Scott, A.D., et al., Noninvasive detection of coronary artery wall thickening with age in healthy subjects using high resolution MRI with beat-to-beat respiratory motion correction. Journal of Magnetic Resonance Imaging, 2011. 34(4): p. 824-830.
Sheahan, M., et al., Atherosclerotic Plaque Tissue: Noninvasive Quantitative Assessment of Characteristics with Software-aided Measurements from Conventional CT Angiography. Radiology, 2017: p. 170127.
Silvera, S.S., et al., Multimodality imaging of atherosclerotic plaque activity and composition using FDG-PET/CT and MRI in carotid and femoral arteries. Atherosclerosis, 2009. 207(1): p. 139-43.
Sirimarco, G., et al., Carotid Atherosclerosis and Risk of Subsequent Coronary Event in Outpatients With Atherothrombosis. Stroke, 2013. 44(2): p. 373-379.
Borger, P.K., Quantitative and systems pharmacology in the postgenomic era: New approaches to discovering drugs and understanding therapeutic mechanisms. QSP White Paper. 2011.
Spaan, J.A., et al., Physiological basis of clinically used coronary hemodynamic indices. Circulation, 2006. 113(3): p. 446-455.
St Pierre, S., et al., Measurement Accuracy of Atherosclerotic Plaque Structure on CT Using Phantoms to Establish Ground Truth. Acad Radiol, 2017(DOI 10.1016/j.acra.2017.04.007).
Stefanini, G.G. and S. Windecker, Can coronary computed tomography angiography replace invasive angiography? Coronary Computed tomography angiography cannot replace invasive angiography. Circulation, 2015. 131(4): p. 418-25; discussion 426.
Steinvil, A., et al., Impact of Carotid Atherosclerosis on the Risk of Adverse Cardiac Events in Patients With and Without Coronary Disease. Stroke, 2014. 45(8): p. 2311-2317.
Strauss, H.W. and J. Narula, Imaging Vulnerable Plaque: A Medical Necessity or a Scientific Curiosity?*. Journal of the American College of Cardiology, 2017. 69(14): p. 1792-1794.
Symons, R., et al., Coronary CT Angiography: Variability of CT Scanners and Readers in Measurement of Plaque Volume. Radiology, 2016. 281(3): p. 737-748.
Takaya, N., et al., Presence of Intraplaque Hemorrhage Stimulates Progression of Carotid Atherosclerotic Plaques: A High-Resolution Magnetic Resonance Imaging Study. Circulation, 2005. 111(21): p. 2768-2775.
Tartari, S., et al., High-Resolution MRI of Carotid Plaque With a Neurovascular Coil and Contrast-Enhanced MR Angiography: One-Stop Shopping for the Comprehensive Assessment of CArotid Atherosclerosis. American Journal of Roentgenology, 2011. 196(5): p. 1164-1171.
Tesche, C., et al., Coronary CT angiography-derived fractional flow reserve: machine learning algorithm versus computational fluid dynamics modeling. Radiology, 2018: p. 171291.
Tesche, C., et al., Prognostic implications of coronary CT angiography-derived quantitative markers for the prediction of major adverse cardiac events. J Cardiovasc Comput Tomogr, 2016. 10(6): p. 458-465.
Tonino, P.A., et al., Angiographic versus functional severity of coronary artery stenoses in the FAME study: fractional low reserve versus angiography in multivessel evaluation. Journal of the American College of Cardiology, 2010. 55(25): p. 2816-2821.

Trelles, M., et al., CTA for Screening of Complicated Atherosclerotic Carotid Plaque—American Heart Association Type VI Lesions as Defined by MRI. American Journal of Neuroradiology, 2013. 34(12): p. 2331-2337.
Tu, S., et al., A novel three-dimensional quantitative coronary angiography system: In-vivo comparison with intravascular ultrasound for assessing arterial segment length. Catheterization and Cardiovascular Interventions, 2010. 76(2): p. 291-298.
Tu, S., et al., In vivo comparison of arterial lumen dimensions assessed by co-registered three-dimensional (3D) quantitative coronary angiography, intravascular ultrasound and optical coherence tomography. Int J Cardiovasc Imaging, 2012. 28(6): p. 1315-1327.
U-King-Im, J.M., et al., Characterization of Carotid Plaque Hemorrhage: A CT Angiography and MR Intraplaque Hemorrhage Study. Stroke, 2010. 41(8): p. 1623-1629.
Underhill, H., et al., Differences in carotid arterial morphology and composition between individuals with and without obstructive coronary artery disease: A cardiovascular magnetic resonance study. Journal of Cardiovascular Magnetic Resonance, 2008. 10(1): p. 31.
Underhill, H.R., et al., A noninvasive imaging approach to assess plaque severity: the carotid atherosclerosis score. AJNR Am J Neuroradiol, 2010. 31(6): p. 1068-75.
Underhill, H.R., et al., Arterial remodeling in [corrected] subclinical carotid artery disease. JACC Cardiovasc Imaging, 2009. 2(12): p. 1381-9.
Underhill, H.R., et al., Automated measurement of mean wall thickness in the common carotid artery by MRI: a comparison to intima-media thickness by B-mode ultrasound. J Magn Reson Imaging, 2006. 24(2): p. 379-87.
van 't Klooster, R., et al., Automated Versus Manual in Vivo Segmentation of Carotid Plaque MRI. American Journal of Neuroradiology, 2012. 33(8): p. 1621-1627.
Gibbons, R.J., High-Risk Coronary Atherosclerotic Plaque Assessment by Coronary Computed Tomography Angiography—Should We Use It? JAMA Cardiol, 2018. 3(2): p. 153-154.
Glagov, S., et al., Compensatory enlargement of human atherosclerotic coronary arteries. N Engl J Med, 1987. 316(22): p. 1371-5.
Gnasso, A., et al., In vivo association between low wall shear stress and plaque in subjects with asymmetrical carotid atherosclerosis. Stroke, 1997. 28(5): p. 993-8.
Goldstein, J.A., et al., The CT-STAT (Coronary Computed Tomographic Angiography for Systematic Triage of Acute Chest Pain Patients to Treatment) Trial. J Am Coll Cardiol, 2011. 58(14): p. 1414-1422.
Gonzalo, N., et al., Morphometric Assessment of Coronary Stenosis Relevance With Optical Coherence Tomography: A Comparison With Fractional Flow Reserve and Intravascular Ultrasound. J Am Coll Cardiol, 2012. 59(12): p. 1080-1089.
Gouya, H., et al., Coronary Artery Stenosis in High-risk Patients: 64-Section CT and Coronary Angiography—Prospective Study and Analysis of Discordance. Radiology, 2009. 252(2): p. 377-385.
Grimm, J., et al., Comparison of symptomatic and asymptomatic atherosclerotic carotid plaques using parallel imaging and 3T black-blood in vivo CMR. Journal of Cardiovascular Magnetic Resonance, 2013. 15(1): p. 44.
Gupta, A., et al., Carotid Plaque MRI and Stroke Risk A Systematic Review and Meta-analysis. Stroke, 2013. 44(11): p. 3071-3077.
Gupta, A., et al., Cost-Effectiveness of Carotid Plaque MR Imaging as a Stroke Risk Stratification Tool in Asymptomatic Carotid Artery Stenosis. Radiology, 2015: p. 142843.
Gupta, A., et al., CT angiographic features of symptom-producing plaque in moderate-grade carotid artery stenosis. AJNR Am J Neuroradiol, 2015. 36(2): p. 349-54.
Gupta, A., et al., Detection of Symptomatic Carotid Plaque Using Source Data from MR and CT Angiography: A Correlative Study. Cerebrovasc Dis, 2015. 39(3-4): p. 151-61.
Gupta, A., et al., Evaluation of computed tomography angiography plaque thickness measurements in high-grade carotid artery stenosis. Stroke, 2014. 45(3): p. 740-5.
Gupta, A., et al., Intraplaque high-intensity signal on 3D time-of-flight MR angiography is strongly associated with symptomatic carotid artery stenosis. American Journal of Neuroradiology, 2014. 35(3): p. 557-561.

(56) References Cited

OTHER PUBLICATIONS

Gupta, A., et al., Magnetic resonance angiography detection of abnormal carotid artery plaque in patients with cryptogenic stroke. Journal of the American Heart Association, 2015. 4(6): p. e002012.
Gupta, A., et al., Semi-Automated Detection of High-Risk Atherosclerotic Carotid Artery Plaque Features from Computed Tomography Angiography, in European Stroke Conference. 2017: Berlin.
Hamdan, A., et al., A Prospective Study for Comparison of MR and CT Imaging for Detection of Coronary Artery Stenosis. JACC: Cardiovascular Imaging, 2011. 4(1): p. 50-61.
Harder, D.R., et al., Functional hyperemia in the brain: hypothesis for astrocyte-derived vasodilator metabolites. Stroke, 1998. 29(1): p. 229-234.
Hardie, A.D., et al., The impact of expansive arterial remodeling on clinical presentation in carotid artery disease: a multidetector CT angiography study. AJNR Am J Neuroradiol, 2007. 28(6): p. 1067-70.
Hassani-Pak, K. and C. Rawlings, Knowledge Discovery in Biological Databases for Revealing Candidate Genes Linked to Complex Phenotypes. J Integr Bioinform, 2017. 14(1).
Hatsukami, T.S. and C. Yuan, MRI in the early identification and classification of high-risk atherosclerotic carotid plaques. Imaging in Medicine, 2010. 2(1): p. 63-75.
Hatsukami, T.S., et al., Visualization of Fibrous Cap Thickness and Rupture in Human Atherosclerotic Carotid Plaque in Vivo With High-Resolution Magnetic Resonance Imaging. Circulation, 2000. 102(9): p. 959-964.
Haug, P.J., et al., A natural language parsing system for encoding admitting diagnoses. Proc AMIA Annu Fall Symp, 1997: p. 814-8.
Haug, P.J., et al., A natural language understanding system combining syntactic and semantic techniques. Proc Annu Symp Comput Appl Med Care, 1994: p. 247-51.
Hecht, H.S., Coronary artery calcium scanning: past, present, and future. JACC Cardiovasc Imaging, 2015. 8: p. 579-596.
Hecht, H.S., J. Narula, and W.F. Fearon, Fractional Flow Reserve and Coronary Computed Tomographic Angiography: A Review and Critical Analysis. Circ Res, 2016. 119(2): p. 300-16.
Helft, G., et al., Progression and regression of atherosclerotic lesions: monitoring with serial noninvasive magnetic resonance imaging. Circulation, 2002. 105(8): p. 993-8.
Hermann, D.M., et al., Coronary Artery Calcification is an Independent Stroke Predictor in the General Population. Stroke, 2013.
Hideya Yamamoto, Y.K., Toshiro Kitagawa, Norihiko Ohashi, Eiji Kunita, Yoshitaka Iwanaga, Kazuhiro Kobuke, Shunichi Miyazaki, Tomohiro Kawasaki, Shinichiro Fujimoto, Hiroyuki Daida, Takashi Fujii, Aki Sato, Tomokazu Okimoto, Sachio Kuribayashi, Coronary plaque characteristics in computed tomography and 2-year outcomes: The PREDICT study. Journal of Cardiovascular Computed Tomography, 2018. Article in Press.
Hlatky, M.A., et al., Projected Costs and Consequences of Computed Tomography-Determined Fractional Flow Reserve. Clinical cardiology, 2013. 36(12): p. 743-748.
Hoffmann, U., et al., Coronary Computed Tomography Angiography for Early Triage of Patients With Acute Chest Pain: The ROMICAT (Rule Out Myocardial Infarction using Computer Assisted Tomography) Trial. J Am Coll Cardiol, 2009. 53(18): p. 1642-1650.
Hoffmann, U., et al., Coronary CT Angiography versus Standard Evaluation in Acute Chest Pain. N Engl J Med, 2012. 367(4).
Hoffmann, U., et al., Prognostic Value of Noninvasive Cardiovascular Testing in Patients With Stable Chest Pain: Insights From the PROMISE Trial (Prospective Multicenter Imaging Study for Evaluation of Chest Pain). Circulation, 2017. 135(24): p. 2320-2332.
Hofman, J.M.A., et al., Quantification of atherosclerotic plaque components using in vivo MRI and supervised classifiers. Magnetic Resonance in Medicine, 2006. 55(4): p. 790-799.
Hulten, E., et al., Coronary Artery Disease Detected by Coronary Computed Tomographic Angiography is Associated With Intensification of Preventive Medical Therapy and Lower Low-Density Lipoprotein Cholesterol. Circulation: Cardiovascular Imaging, 2014. 7(4): p. 629-638.

Ibrahimi, P., et al., Coronary and carotid atherosclerosis: How useful is the imaging? Atherosclerosis, 2013. 231(2): p. 323-333.
Inoue, K., et al., Serial Coronary CT Angiography—Verified Changes in Plaque Characteristics as an End Point: Evaluation of Effect of Statin Intervention. JACC: Cardiovascular Imaging, 2010. 3(7): p. 691-698.
Insull, W., The pathology of atherosclerosis: plaque development and plaque responses to medical treatment. Am J Med, 2009. 122(1 Suppl): p. S3-S14.
International Search & Written Opinion in co-pending International patent application No. PCT/US2018/046483, dated Feb. 5, 2019.
International Search & Written Opinion in co-pending International patent application No. PCT/US2016/065132, dated Mar. 17, 2017.
Isbell, D.C., et al., Reproducibility and reliability of atherosclerotic plaque volume measurements in peripheral arterial disease with cardiovascular magnetic resonance. Journal of Cardiovascular Magnetic Resonance, 2007. 9(1): p. 71-76.
Itu, L., et al., A machine-learning approach for computation of fractional flow reserve from coronary computed tomography. Journal of Applied Physiology, 2016. 121(1): p. 42-52.
Jcgm, J., Evaluation of measurement data—Guide to the expression of uncertainty in measurement. Int. Organ. Stand. Geneva ISBN, 2008. 50: p. 134.
Johnson, A.J., et al., Cohort Study of Structured Reporting Compared with Conventional Dictation. Radiology, 2009. 253(1): p. 74-80.
Johnson, N.P., R.L. Kirkeeide, and K.L. Gould, Is discordance of coronary flow reserve and fractional flow reserve due to methodology or clinically relevant coronary pathophysiology? JACC: Cardiovascular Imaging, 2012. 5(2): p. 193-202.
Joseph A. Ladapo, K.S.G., Pamela S. Douglas, Projected Morbidity and Mortality from Missed Diagnoses of Coronary Artery Disease in the United States. Int J Cardiol, 2015. Sep. 15, 2015: p. 250-252.
Joshi, A.A., et al., GlycA is a Novel Biomarker of Inflammation and Subclinical Cardiovascular Disease in Psoriasis. Circ Res, 2016. 119(11): p. 1242-1253.
Joshi, F.R., et al., Non-invasive imaging of atherosclerosis. European Heart Journal—Cardiovascular Imaging, 2012. 13(3): p. 205-218.
van den Bouwhuijsen, Q.J.A., et al., Determinants of magnetic resonance imaging detected carotid plaque components: the Rotterdam Study. Eur Heart J, 2012. 33(2): p. 221-229.
van't Klooster, R., et al., Automatic lumen and outer wall segmentation of the carotid artery using deformable three-dimensional models in MR angiography and vessel wall images. Journal of Magnetic Resonance Imaging, 2012. 35(1): p. 156-165.
Vegsundvøg, J., et al., Coronary Flow Velocity Reserve in the Three Main Coronary Arteries Assessed with Transthoracic Doppler: A Comparative Study with Quantitative Coronary Angiography. Journal of the American Society of Echocardiography, 2011. 24(7): p. 758-767.
Virmani, R., et al., Lessons from sudden coronary death: a comprehensive morphological classification scheme for atherosclerotic lesions. Arterioscler Thromb Vasc Biol, 2000. 20(5): p. 1262-75.
Vliegenthart, R., et al., Dual-Energy CT of the Heart. American Journal of Roentgenology, 2012. 199(5_supplement): p. S54-S63.
von Birgelen, C., et al., Relation Between Progression and Regression of Atherosclerotic Left Main Coronary Artery Disease and Serum Cholesterol Levels as Assessed With Serial Long-Term (=12 Months) Follow-Up Intravascular Ultrasound. Circulation, 2003. 108(22): p. 2757-2762.
Voros, S., et al., Prospective Validation of Standardized, 3-Dimensional, Quantitative Coronary Computed Tomographic Plaque Measurements Using Radiofrequency Backscatter Intravascular Ultrasound as Reference Standard in Intermediate Coronary Arterial Lesions: Results From the Atlanta I Study. JACC: Cardiovascular Interventions, 2011. 4(2): p. 198-208.
Vukadinovic, D., Automated Quantification of Atherosclerosis in CTA of Carotid Arteries. 2012: Erasmus University Rotterdam.
Wagenknecht, L., et al., Correlates of Carotid Plaque Presence and Composition as Measured by MRI: The Atherosclerosis Risk in Communities Study. Circulation: Cardiovascular Imaging, 2009. 2(4): p. 314-322.

(56) References Cited

OTHER PUBLICATIONS

Walker, L.J., et al., Computed tomography angiography for the evaluation of carotid atherosclerotic plaque correlation with histopathology of endarterectomy specimens. Stroke, 2002. 33(4): p. 977-981.
Wan, T., et al., Spatio-temporal texture (SpTeT) for distinguishing vulnerable from stable atherosclerotic plaque on dynamic contrast enhancement (DCE) MRI in a rabbit model. Medical Physics, 2014 (Apr. 2014).
Wasserman, B.A., et al., Carotid artery atherosclerosis: in vivo morphologic characterization with gadolinium-enhanced double-oblique MR imaging initial results. Radiology, 2002. 223(2): p. 566-73.
Wasserman, B.A., et al., MRI measurements of carotid plaque in the atherosclerosis risk in communities (ARIC) study: Methods, reliability and descriptive statistics. Journal of Magnetic Resonance Imaging, 2010. 31(2): p. 406-415.
Wasserman, B.A., et al., Risk Factor Associations With the Presence of a Lipid Core in Carotid Plaque of Asymptomatic Individuals Using High-Resolution MRI: The Multi-Ethnic Study of Atherosclerosis (MESA). Stroke, 2008. 39(2): p. 329-335.
Weichert, W. and A. Warth, Early lung cancer with lepidic pattern: adenocarcinoma in situ, minimally invasive adenocarcinoma, and lepidic predominant adenocarcinoma. Current opinion in pulmonary medicine, 2014. 20(4): p. 309-316.
Williams MC, M.A., Nicol E, Newby DE, Cardiac CT Improves Outcomes in Stable Coronary Heart Disease: Results of Recent Clinical Trials. Current Cardiovascular Imaging Reports, 2017. 10(14).
Yong, A.S., et al., The relationship between coronary artery distensibility and fractional flow reserve. PloS one, 2017. 12(7): p. e0181824.
Yoon, Y.E., et al., Noninvasive diagnosis of ischemia-causing coronary stenosis using CT angiography: diagnostic value of transluminal attenuation gradient and fractional flow reserve computed from coronary CT angiography compared to invasively measured fractional flow reserve. JACC: Cardiovascular Imaging, 2012. 5(11): p. 1088-1096.
Yoshida, K., et al., Characterization of Carotid Atherosclerosis and Detection of Soft Plaque with Use and Black-Blood Mr Imaging. American Journal of Roentgenology, 2008. 29: p. 868-874.
Zainon, R., et al., Spectral CT of carotid atherosclerotic plaque: comparison with histology. European radiology, 2012. 22(12): p. 2581-2588.
Zavodni et al. "Carotid Artery Plaque Morphology and Composition in Relation to Incident Cardiovascular Events: The Multi-Ethnic Study of Atherosclerosis (MESA)." Radiol. 271.2(2014):361-389.
Zhao, Q., et al., Association between coronary artery calcium score and carotid atherosclerotic disease. Molecular medicine reports, 2013. 8(2): p. 499-504.
Zhao, Q., et al., Association of Coronary Calcification and Carotid Artery Morphology: a High Resolution Magnetic Resonance Imaging Study. Proc. Intl. Soc. Mag. Reson. Med. 17, 2009. 17: p. 27.
Zhao, Q., et al., Correlation of Coronary Plaque Phenotype and Carotid Atherosclerotic Plaque Composition. The American Journal of the Medical Sciences, 2011. 342(6): p. 480-485 10.1097/MAJ. 0b013e31821caa88.
Zhao, X., et al., Discriminating carotid atherosclerotic lesion severity by luminal stenosis and plaque burden: a comparison utilizing high-resolution magnetic resonance imaging at 3.0 Tesla. Stroke, 2011. 42(2): p. 347-53.
International Search Report & Written Opinion in co-pending International patent application No. PCT/US16/67463 dated Mar. 10, 2017. (10 pages).
"Eye tracking in advertising research—Tobii Pro", downloaded from https://www.tobiipro.com/fields-of-use/marketing-consumer-research/advertising/, retrieved on Oct. 10, 2017, 14 pages.
"MIT Saliency Benchmark", retrieved from http://saliency.mit.edu/results _ mit300.html, downloaded on Oct. 10, 2017, 17 pages.
"SalNet: Deep Convolutional Networks for Saliency Prediction", retrieved from https://algorithmia.com/algorithms/deeplearning/SalNet, downloaded on Oct. 10, 2017, 4 pages.
Bylinskii, et al., "Learning Visual Importance for Graphic Designs and Data Visualizations", Proceedings of the 30th Annual ACM Symposium on User Interface Software & Technology (UIST '17), http://dx.doi.org/10.1145/3126594.3126653, Aug. 8, 2017, 13 pages.
Jahanian, et al., "Recommendation System for Automatic Design of Magazine Covers", Proceedings of the 2013 International Conference on Intelligent User Interfaces (IUI '13), DOI: https://doi.org/10.1145/2449396.2449411, Mar. 2013, New York, NY, pp. 95-106.
Krafka, et al., "Eye tracking for Everyone", Proceedings of the IEEE Conference on Computer Vision and Pattern Recognition, 2016, 9 pages.
Liu, et al., "Predicting Eye Fixations using Convolutional Neural Networks", Proceedings of the IEEE Conference on Computer Vision and Pattern Recognition, 2015, 9 pages.
Ma, et al., "Advertisement evaluation using visual saliency based on foveated image", Multimedia and Expo, 2009, ICME 2009, IEEE International Conference on. IEEE, 2009, 4 pages.
Pan, et al., "Shallow and Deep Convolutional Networks for Saliency Prediction", Proceedings of the IEEE Conference on Computer Vision and Pattern Recognition, Mar. 2, 2016, pp. 1-10.
Wadhwa, Tarun , "Eye-Tracking Technologies Are About to Make Advertising Even More Invasive", retrieved from https://www.forbes.com/sites/tarunwadhwa/2013/05/08/with-recent-advances-in-eye-tracking-advertising-set-to-become-even-more-invasive, Forbes, May 8, 2013, 4 pages.
Li, et al., "Webpage saliency prediction with multi-features fusion," Image Processing (ICIP), 2016 IEEE International Conference on. IEEE, 2016, 5 pages.
Still, et al., "A saliency model predicts fixations in web interfaces," 5th International Workshop on Model Driven Development of Advanced User Interfaces (MDDAUI 2010), Apr. 2010, 5 pages.
Xu, et al., "Spatio-temporal modeling and prediction of visual attention in graphical user interfaces," Proceedings of the 2016 CHI Conference on Human Factors in Computing Systems, May 2016, 12 pages.
Roller, Colleen, "Using Salience to Guide User Decision-Making," retrieved from https://uxmag.com/articles/using-salience-to-guide-user-decision-making, UX Magazine, Article No. 795, Mar. 2012, 9 pages.

\* cited by examiner

600

```
┌─────────────────────────────────────────────┐
│       Obtain historical content items       │
│                    602                      │
└─────────────────────────────────────────────┘
                      │
                      ▼
┌─────────────────────────────────────────────┐
│ Generate and issue crowdsource tasks that   │
│ calibrate a gaze tracker and obtain a       │
│ plurality of video streams for each         │
│ historical content item                     │
│                   604                       │
└─────────────────────────────────────────────┘
                      │
                      ▼
┌─────────────────────────────────────────────┐
│           Receive the video streams         │
│                    606                      │
└─────────────────────────────────────────────┘
                      │
                      ▼
┌─────────────────────────────────────────────┐
│ Generate gaze points for frames in the      │
│ first n seconds of each video stream        │
│                   608                       │
└─────────────────────────────────────────────┘
                      │
                      ▼
┌─────────────────────────────────────────────┐
│ Determine content elements for each         │
│ historical content item                     │
│                   610                       │
└─────────────────────────────────────────────┘
                      │
                      ▼
┌─────────────────────────────────────────────┐
│ Determine a saliency score for each element │
│ of each historical content item             │
│                   612                       │
└─────────────────────────────────────────────┘
```

FIG. 6

SALIENCY PREDICTION FOR A MOBILE USER INTERFACE

TECHNICAL FIELD

This description relates to training and use of neural networks for predicting the saliency of user interface elements.

BACKGROUND

Neural networks, especially deep neural networks have been very successful in modeling high-level abstractions in data. Neural networks are computational models used in machine learning made up of nodes organized in layers. The nodes are also referred to as artificial neurons, or just neurons, and perform a function on provided input to produce some output value. A neural network requires a training period to learn the parameters, i.e., weights, used to map the input to a desired output. Each neural network is trained for a specific task, e.g., prediction, classification, encoding/decoding, etc. The task performed by the neural network is determined by the inputs provided, the mapping function, and the desired output. Training can be either supervised or unsupervised. In supervised training, training examples are provided to the neural network. A training example includes the inputs and a desired output. Training examples are also referred to as labeled data because the input is labeled with the desired output. The network learns the values for the weights used in the mapping function that most often result in the desired output when given the inputs. In unsupervised training, the network learns to identify a structure or pattern in the provided input. In other words, the network identifies implicit relationships in the data. Unsupervised training is used in deep neural networks as well as other neural networks and typically requires a large set of unlabeled data and a longer training period. Once the training period completes, the neural network can be used to perform the task for which it was trained.

In a neural network, the neurons are organized into layers. A neuron in an input layer receives the input from an external source. A neuron in a hidden layer receives input from one or more neurons in a previous layer and provides output to one or more neurons in a subsequent layer. A neuron in an output layer provides the output value. What the output value represents depends on what task the network is trained to perform. Some neural networks predict a value given in the input. Some neural networks provide a classification given the input. When the nodes of a neural network provide their output to every node in the next layer, the neural network is said to be fully connected. When the neurons of a neural network provide their output to only some of the neurons in the next layer, the network is said to be convolutional. In general, the number of hidden layers in a neural network varies between one and the number of inputs.

Mobile devices have become ubiquitous in recent years, causing an explosion in the number of applications that are available for these devices. Mobile applications differ from web-based and personal computing device based applications in a few aspects. For example, mobile applications have much more limited screen space, which in turn limits the size and number of user-interface elements that can be shown to a user at one time. As another example, mobile applications typically are more data-conscious because obtaining data over a mobile phone network can be slow. This factor may also limit the number and type of user interface elements in a mobile application. User interface elements include text, controls (e.g., buttons, checkboxes, radio buttons, drop-down lists, hyperlinks, etc.), images, and the like. Mobile application user interfaces are one example of a content item. Other examples of content items include a document, an email, a pamphlet, a web page, a poster, etc.

Designing content items typically involves making many choices, such as font color and size, image placement, heading size and placement, size, color, and placement of controls or other action items, etc. Design can be especially important in a mobile application user interface due to the limitations discussed above. Current software applications provide a content creator with the ability to make these design choices in the layout the content. While such applications show the content creator how the information will appear in the finished content item, they do not provide any guidance on the effectiveness of the content, e.g., in drawing attention to a particular element or elements of the content.

SUMMARY

A content saliency neural network, also referred to as a content saliency network, is a machine-learned neural network trained to predict the saliency of elements in a content item, e.g., the salience of user-interface elements in a mobile application. Saliency is the state or quality by which an element stands out relative to its neighbors. Saliency can thus represent the likelihood that an element draws attention to itself. The content saliency neural network may be trained to provide a saliency score for each of a set of elements in a content item. The saliency score represents the probability of a human viewing the content looking at the element within a predetermined time and is based on the visual features of the element and the content in general. The content saliency neural network may be trained using eye-gaze information from various users in the first few seconds of viewing existing content items. The eye-gaze information may be made more accurate via a calibration technique that also uses a machine-learned neural network to predict coordinates for the eye gaze data. Inputs to the content saliency neural network may include four feature vectors for each element identified in a digital version of the content, e.g., a screenshot of a user interface. One feature vector represents simple features of the element. Simple features represent characteristics of the element discernable from the content itself, such as width, height, area, position, color moments of the element, etc. In some implementations, the remaining three feature vectors represent context feature vectors for multiple zoom levels. In some implementations, the three context feature vectors may be obtained using transfer learning e.g., another neural network. For example, the context feature vectors may be obtained from the encoder portion of an autoencoder trained on the content items used to collect the eye-gaze data. In some implementations, an autoencoder is trained for each zoom level. Each zoom level represents a context for a particular element. Training examples used to train the saliency neural network may include the four feature vectors for an element and a saliency score generated for the element from the eye gaze data that corresponds to the content item.

Once trained, the saliency neural network can be used to predict the saliency of the various elements that make up a future content item, e.g., a user interface currently under development. For example, a screenshot of a user interface (UI) may be provided to the system, feature vectors determined for the various user interface elements, and a saliency prediction obtained for each user interface element. In some implementations, the system may present the saliency of the user interface elements in a saliency map. A content creator, e.g., an application developer, can use the saliency map to determine whether user interface elements have intended saliency and, if not, revise the UI layout. In some implementations, the saliency map may be a heat map.

Disclosed implementations can include one or more of the following benefits. For example, the content saliency neural network can be used to speed up the design process for a content item, significantly reducing the turn-around time. The design process is sped up because the content saliency neural network provides a tool for selecting color, shape, position, size, etc. of various user interface elements without obtaining human feedback. In other words, the content saliency neural network can be used to compare two versions of a user interface layout immediately, for example as part of AB testing. In contrast, obtaining human feedback on the two versions can take hours, if not days. As another example, the content saliency neural network provides objective rather than subjective feedback. Human feedback is subjective, not representative of a larger population, and not based on actual viewing patterns. Thus, the content saliency neural network is more accurate than human feedback because it is based on objective data gathered from hundreds or thousands of workers rather than subjective judgment from a couple of coworkers or designers. Implementations can therefore not only reduce the cost of producing a mobile application but can also shorten the production timeline. Such benefits are important for brands seeking to provide an engaging experience for customers on mobile platforms.

As another example, some implementations use a specially trained autoencoder to generate the features used as input to the saliency neural network. An autoencoder is a neural network with two parts; an encoder and a decoder. The encoder reduces the input to a lower dimensional (smaller size) representation and the decoder takes the representation and attempts to reconstruct the original input. The objective of the autoencoder is to make the reconstruction as close to the original as possible. Thus, the encoder portion of the autoencoder learns which features are most useful and retains more information about those features, e.g., in order for the decoder to reproduce an accurate representation of the original. Thus, the output of the encoder is of smaller size but retains information (features) about the most important elements in the content item. Accordingly, implementations using the output of the encoder are faster and more accurate than other saliency models.

As another example, the content saliency neural network provides feedback at an element level. This is beneficial because content elements correspond to elements for which a content creator can take action. Providing saliency at the element level, rather than at the pixel level, makes it easier for a content creator to manipulate the layout to improve saliency, if needed. The content saliency neural network can be used to produce better quality content items that maximize the chances of the content having the intended effect on the recipient. The saliency of the elements in the content provides feedback on which elements are likely to be viewed, so that elements considered most important by the content creator are most likely to be seen by the recipient. Such information is beneficial because, for example, users may spend only a few seconds deciding whether a mobile application is appealing, e.g., before installing the application from an app store, and because users are more likely to use a mobile application where the important elements are easy and intuitive to locate. With the large number of mobile applications available, such advantages can affect how often a mobile application is downloaded and the rating a user gives the mobile application.

The content saliency neural network can be included as a tool in a content design application, such as a user-interface design tool, an email editor, an HTML editor, a word processing program, a presentation program, a spreadsheet program, or any other similar application. The content saliency neural network can also be made available as a separate service, e.g., over a network such as the Internet.

The details of one or more implementations are set forth in the accompanying drawings and the description below. Other features will be apparent from the description and drawings, and from the claims.

BRIEF DESCRIPTION OF THE DRAWINGS

FIG. 6 is an example flowchart illustrating an example process for generating training data to train a content saliency neural network, according to an implementation.

DETAILED DESCRIPTION

Figure 1:
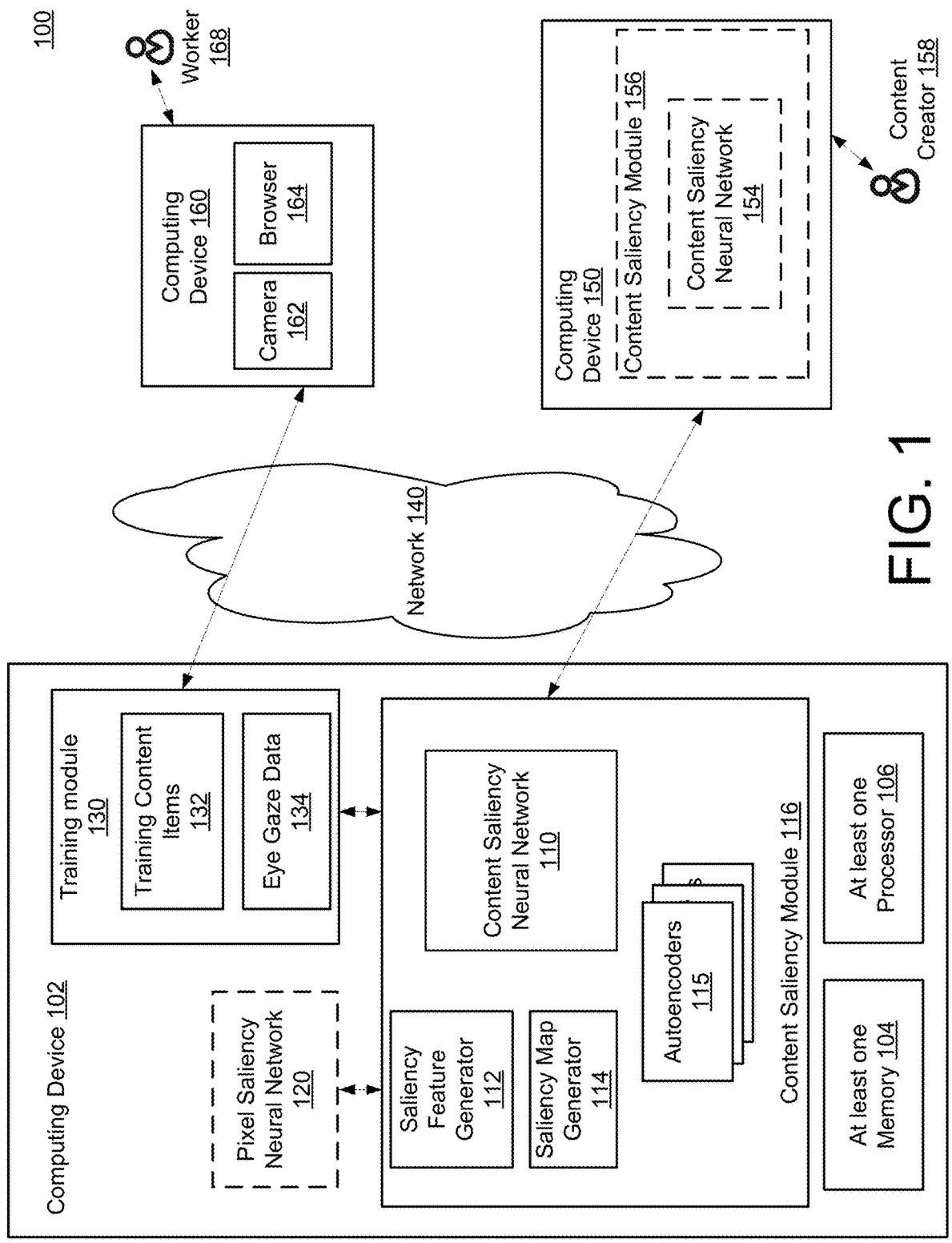
FIG. 1 is a block diagram of a system for providing saliency feedback for elements of a content item using a saliency neural network, according to an implementation.

Systems and methods train a machine-learned content saliency neural network to predict the saliency of content elements, enabling a content creator to determine whether a particular content item layout has an intended effect and to manipulate the elements in real-time to improve the effectiveness of the content. Saliency provides an indication of what a user will see in the first few seconds of viewing the content. Thus, implementations guide a content creator during the creative process so that elements the content creator desires to be viewed have the best chance of actually being viewed and/or used by a user. A content saliency neural network is trained using actual eye-gaze data for a set of training content items. The training content items are historical content items, meaning they have been previously provided to recipients. One example of a historical content item is a screenshot of a user interface for a mobile application already available for installation via an app store. The content saliency neural network generates simple features extracted from given content, as well as context feature vectors for different resolutions for each content element. In some implementations, the context vectors may be encoded vectors output from the encoder component of an autoencoder. In some implementations, the vectors may be pixel-based features for the different resolutions. Using these features, the content saliency neural network predicts which elements have a high probability of being viewed first and which do not. The content saliency neural network neural has a low memory footprint, e.g., around 30 mb and can be provided as a cloud-based service or downloaded to a developer's computing device.

As used herein, content items refer to files that have at least one text-based element used to convey information to a reader. Example content items include user interfaces, documents, emails, pamphlets, web pages, posters, presentation slides, and the like. Content refers to the text, images, and other information that make up the content item. A content element, or just element is any object on which a content creator can take action. Example elements include an icon, a title, a heading, an image, a button, a text box, a link, a paragraph, a table, a span, etc. In a user interface, some elements may correspond to objects in computer code, e.g., XML (extensible-mark-up language) code. This code that generates a user interface (UI) may be available via a debug tool.

Some elements may correspond to objects in a document object model (DOM). A document object model is a tree data structure for content items in a mark-up language format, HTML, where each node in the tree represents a part of the markup-based content designated by a markup tag. Natural images refer to images that do not generally include text and instead are mostly images of places, people, and objects. Put another way, although text may appear in a natural image, the primary purpose of a natural image is to serve as a picture, not to convey textual information.

As used herein, a saliency score for an element is a measure of how much the element stands out relative to its neighbors; e.g., the higher the saliency score for an element, the more likely it is that the reader will view the element within a given time frame (e.g., a few seconds). As used herein, saliency is based on eye gaze data. Eye gaze data is data that represents which elements in a particular content item correspond to viewed coordinates on a display of the content item, the viewed coordinates being determined by recording a viewer looking at the display. Put another way, eye gaze data is data that measures how much a particular element actually stood out relative to its neighbors to a human viewer.

As used herein, neural networks refer to computational models used in machine learning and are made up of nodes organized in layers. Training a neural network is using training examples, each example being an input and a desired output, to let the neural network, over a series of iterative rounds, determine optimal weight values in a mapping function that results in the neural network providing the desired output given the input. During each round, the weights in the mapping function are adjusted to address incorrect output. Once trained, the neural network can be used to predict an output based on provided input. Input to a neural network is typically in the form of a feature vector. A feature vector is an array of numbers. The numbers may be integers or floating point numbers. The array may be one or more dimensions and can be tens, hundreds, or even thousands of dimensions.

As used herein, an autoencoder is a neural network with two parts; an encoder and a decoder. The encoder takes an input and reduces the input to a lower dimensional (smaller size) representation. For example, an encoder may take an image as input and reduce the size of the image, e.g., generate a compressed image. The decoder takes the representation (e.g., the compressed image) and attempts to reconstruct the original input (e.g., the original image). The objective of the autoencoder is to make the reconstruction as close to the original as possible. In order to make the reproduction as close to the original as possible, autoencoders learn useful structure in the data, e.g., the structure most important to reproducing the original input. Autoencoders can be trained on specific types of input. Some autoencoders are denoised autoencoders. A denoised autoencoder receives not only original input, but also corrupted input, and is trained to reproduce the original input from both. In other words, a denoised autoencoder functions even in the presence of corruptions. Denoised autoencoders are able to learn structure that regular autoencoders are unable to learn.

As used herein, a content saliency neural network takes as input a simple feature vector and two or more context feature vectors for a content element of a content item and provides as output a saliency score for the element. A simple feature represents a characteristic or attribute of the content element, such as color, width, height, area, position, etc., of the element. The color may be represented by color moments for the three color channels. A color moment characterizes color distribution in an image, similar to moments of a probability distribution. The context feature vectors for an element may be encoded features from the encoder portion of an autoencoder trained on content items. In other words, the output of the encoder may be used as input to the content saliency neural network. The context feature vectors may be taken at different zoom levels. For example, a lowest zoom level may be the entire content item. For example, a screenshot of the entire user interface may be provided to the encoder. A highest zoom level may be the content element. In this example, only pixels of the screenshot corresponding to the content element are provided to the encoder. The highest zoom level may correspond to a bounding box. A bounding box is the smallest shape, typically but not always a rectangular box, that encloses the entire element. An intermediate zoom level may be an intermediate context and only pixels of the screenshot corresponding to some area larger than the element but smaller than the entire user interface is provided to the encoder. In some implementations, a different autoencoder may be trained on images of each zoom level.

In some implementations, the context features are saliency matrices. A saliency matrix is a pixel-by-pixel representation of an image where each pixel is represented in the matrix by a value that represents the salience of the pixel within the image. In some implementations, the value may be between 0-255, with higher numbers corresponding to higher salience. The saliency matrix may be the output of a neural network trained to provide the saliency of each pixel in a natural image. The images provided to a neural network trained to provide the saliency matrix correspond to the different zoom levels, as discussed above.

A saliency map displays the elements in a content item represented by their respective saliency scores. The saliency map may use variation in color and/or pattern to represent various saliency ranges. In some implementations, the saliency map may be referred to as a heat map. In some implementations, the saliency scores of all elements in a content item may be normalized, so the total of all saliency scores for elements in the content item sum to one.

Details of the systems and techniques are discussed below with respect to the illustrated figures. FIG. 1 is a block diagram of a system 100 for training and using a content saliency neural network 110. The system 100 includes a computing device 102 having at least one memory 104, at least one processor 106, and one or more modules, such as training module 130 and content saliency module 116. The computing device 102 may communicate with one or more other computing devices, e.g., computing device 150 and computing device 160 over a network 140. The computing device 102 may be implemented as a server, a desktop computer, a laptop computer, a mobile device such as a tablet device or mobile phone device, as well as other types of computing devices. Although a single computing device 102 is illustrated, the computing device 102 may be representative of multiple computing devices in communication with one another, such as multiple servers in communication with one another being utilized to perform its various functions over a network.

The at least one processor 106 may represent two or more processors on the computing device 102 executing in parallel and utilizing corresponding instructions stored using the at least one memory 104. In some implementations, the at least one processor 106 may be a specialized processor, e.g. a graphics processing unit (GPU). The at least one memory 104 represents a non-transitory computer-readable storage medium. Of course, similarly, the at least one memory 104 may represent one or more different types of memory utilized by the computing device 102. In addition to storing instructions, which allow the at least one processor 106 to implement disclosed embodiments, the at least one memory 104 may be used to store data, such as one or more of the training content items 132, eye gaze data 134, a pixel saliency neural network 120, autoencoders 115, and/or the content saliency neural network 110. The at least one memory 104 may also be used to store processes and modules, such as training module 130 or content saliency module 116, saliency feature generator 112, saliency map generator 114, etc., and their components.

The training module 130 may be configured to generate eye gaze data 134 from a set of training content items 132. The training content items 132 are any type of content items with text, such as a mobile application user interface, a document, an email, a web page, a pamphlet, a poster, etc. In some implementations, the content item may be XML-based, HTML-based, PDF-based, image-based, rich text based, etc. The content item may be created in an editor, e.g., an XML editor, a HTML editor, a word processing program, a presentation program, a PDF program, an image editing program, a spreadsheet program, or the like. In some implementations, the training content items 132 include historical mobile user interfaces, e.g., screenshots of user interfaces of mobile applications available for download and installation from an app store. App stores track statistics for such mobile applications, e.g., tracking the number of downloads and/or user-based ratings of the mobile applications. In some implementations, the training module 130 may use these statistics to select the mobile applications to be included in the training content items 132. For example, a variety of mobile applications may be selected so that some popular mobile applications (based on number of downloads and/or user ratings) are included in the training content items and some less popular (e.g., low number of downloads or low user ratings) are included. Where the content item is a user interface, a screenshot of the user interface may be obtained and stored as the historical content item. As used herein, reference to a user interface may be understood to refer to a screenshot of the user interface. Of course, historical content items can be other types of content, such as email-based items actually sent to recipients or content items that have been made available to and viewed by the intended recipients.

Each content item in the set of training content items 132 may include a plurality of elements. An element is any object on which the content creator can take action. Examples of elements include a text box, a button, a link, a drop-down, an icon, a checkbox, a radio button, a title, a heading, an image, a paragraph, a table, a span, etc. In some implementations, the training module 130 may automatically detect the elements. For example, a user interface of a mobile application is associated with underlying computer code, such as XML, Java, etc. The underlying code may be made available to the training module 130 by tools, such as debugging tools (e.g., ANDROID debug tools). The training module 130 may identify the elements of the user interface by the computer code. The elements may be defined by a bounding box. A bounding box is the smallest shape, typically but not always, a rectangular box, that encloses the entire element.

In some implementations, the training module 130 may automatically detect the elements using a document object model (DOM) tree for the content item. A DOM tree is associated with markup based content, such as HTML, and each node in the tree represents a part of the markup-based content designated by a markup tag. In some implementations, the elements may be defined by a user, e.g., by tagging or a GUI-based selection. For example, a GUI (graphical user interface) may enable a content creator to designate an element by drawing a box or other shape around the element. In some implementations, the training module 130 may communicate with and use a component of the content saliency module 116, which determines the elements.

To obtain the eye gaze data 134 the training module 130 may generate crowd-source tasks designed to receive video for each of the training content items. In some implementations, the training module 130 may generate crowd-source training tasks that result in a predetermined number of workers providing eye gaze data for a particular training content item. For example, the crowd-sourced training tasks may ensure that at least x workers view one particular training content item, so that the particular training content item has x sets of corresponding video stream that may be stored as part of eye gaze data 134. The value of x can be any predetermined number can be any number greater than two. In an example where x is eight, each training content item in the set of training content items 132 has eight sets of eye gaze data 134. In some implementations, the crowd-sourced task for a particular worker may include a predetermined number of training content items 132. For example, a worker may view 15 training content items as part of the crowd-source task, providing a video stream stored in eye gaze data 134 for each of the 15 training content items. The worker may be asked just to view the content, with no other specific directions or task given.

The eye gaze data 134 may include a video stream collected from a computing device 160 operated by a worker 168 over network 140, which may include the Internet. The crowd-source task may be browser-based, so computing device 160 may run browser 164. In some implementations, the crowd-source task may be accomplished with a mobile application instead of a browser. The computing device 160 may also include a front-facing camera 162, which records video of the worker 168 as the worker 168 views a training content item provided in the crowd-sourced task. The computing device 160 may be a personal computer with a web camera, a laptop computer with a web camera, a mobile phone, a tablet with a front-facing camera, a wearable device with a front facing camera, or the like.

The eye gaze data 134 can be collected using an application, including a browser 164, that displays the training content item for a number of seconds while recording video of the worker 168 during those seconds with a front-facing (e.g., "selfie" or web) camera 162. Once the training module 130 obtains the video it may generate gaze points for each frame of the video. In some implementations, the training module 130 may generate a cropped image of the face, the left eye, and the right eye from the frame, as well as a face grid representing the position of the face within the frame. The training module 130 may use conventional techniques, such as face and eye detection functions available in the dlib open-source library, or other similar or later developed techniques. The training module 130 generates a gaze point for the frame from the cropped images and the face grid. A gaze point is an x,y coordinate representing a location on the display at which the worker's eyes are fixated in the frame. In some implementations, the training module 130 may use an eye-tracking neural network to generate the gaze point. iTracker is an example eye-tracking neural network that can be used to generate the gaze points for the eye gaze data 134. iTracker is a convolutional neural network for eye tracking developed by K. Krafka et al. that takes as input the cropped images of the face, right eye, left eye, and face grid and provides as output the x,y coordinate for the frame. Other similar techniques may be used. The training module 130 may generate a gaze point for each frame of the video in the first n seconds of the video. The value of n may be dependent on use-case. For example, a content item that is an advertisement may want a small value for n, e.g., only a few seconds, where a content item that is a user interface or a web page may tolerate a longer value for n.

The training module 130 may use the gaze points to calculate the probability of a fixation point falling on a particular pixel. For example, the training module 130 may generate a fixation map for each training content item using the gaze points for each frame. Through this procedure, the training module 130 generates a pixel-level probabilistic heat-map. From the pixel-level heat-map, the training module 130 may determine which element(s) of the training content item corresponds with which pixels in the heat-map. For example, the training module 130 may compute the integral of the pixel-level saliency density over the area covered by an element. This may be followed by a normalization over all elements to ensure that the vector sums to one (1). In other words, in a user interface with k elements, the training module 130 represents the element saliency map $E=E_1, \ldots, E_k)'$ as a vector of probabilities where $E_j$ is the probability of element j being fixated. When one element overlaps another element, the saliency of the pixels in overlapping regions are assigned to the element on top.

In some implementations, in addition to collecting a video stream for the training items, the crowd-sourced task may include a calibration task. The calibration task improves the prediction of the gaze points (e.g., reducing the error from 3.5 cm to 1.4 cm). The calibration task displays a moving object at different positions on the screen for a predetermined number of seconds. For example, a task may display a moving object at 11 different positions over 20 seconds. The worker may be instructed to follow the object on the screen with their eyes and the task may include capturing a video of the worker 168, e.g., using front-facing camera 162, as the worker's eyes follows the object. This video may be provided to a linear regression model. The linear regression model is trained to predict the actual coordinates of the moving object given the gaze points predicted by iTracker as the features. The regression output may be used as the gaze points. In some implementations, the training module 130 may generate a 2-dimensional co-variance matrix that is used during generation of the pixel-level probabilistic heatmap. For example, the 2-dimensional co-variance matrix may be used in Gaussian blurring of the fixation maps for each content item. Converting fixation locations to a continuous distribution allows for uncertainty in the eye-tracking ground truth measurements to be incorporated. Put another way, the calibration provides a linear translation of the eye gaze coordinates, the translated points having been adjusted to accommodate different screen sizes and errors arising due to mobile positions while holding the mobile device. The calibration task improves the mapping of the gaze points to content elements, so that the mapping is more accurate. The data obtained during the calibration task may be considered part of the eye gaze data 134.

The training module 130 may generate a saliency score for each element in each training content item. The saliency score represents the probability of eye gaze falling on the element when viewing the whole content item. Put another way, the saliency score is a measure of how much the element stands out relative to its neighbors. In some implementations, the salience score is based on the pixel-level heat map, as described above, e.g., a vector of probabilities. The saliency score for each element in each training content item may be considered part of the eye gaze data 134, even if it is calculated at training time and only temporarily stored.

The eye gaze data 134 is thus data from which a saliency score for each content element in the training content items can be determined. In some implementations, the system may store the video streams captured via the crowdsource tasks and then may calculate the gaze points and then the saliency score for each content element at training time. In such an implementation, each video stream may be associated with a particular training content item in eye gaze data 134. In some implementations, the system may store a set of coordinates for each frame of the video stream that falls within the first n seconds of the video stream, n being a predetermined integer and may calculate the saliency scores at training time. In such implementations, each training content item is associated with a set of coordinates in eye gaze data 134. Thus, if a content item is viewed by ten workers, the content item will have ten sets of coordinates, each set including a coordinate for each frame in the first n seconds of a video stream for the content item. In some implementations, the system may store the pixel-level heat map for each content item as part of the eye gaze data 134. In some implementations, the system may store, as part of the eye gaze data 134, any information from which the saliency score for each content element can be calculated. In some implementations, the eye gaze data 134 is the calculated saliency scores for each content element of each training content item. Of course, implementations may include two or more of the combinations described above.

The training module 130 may train a content saliency neural network 110 using the training content items 132 and the corresponding eye gaze data 134. In some implementations, the training module 130 may also train one or more autoencoders 115 using the training content items 132. In some implementations, the autoencoders 115 are part of a content saliency module 116. In some implementations, the autoencoders 115 (not shown) are separate from, but operably coupled to/accessible by the content saliency module 116. The autoencoders 115 are neural networks that com-press an input, e.g., a training content item, and then reconstruct the input. The autoencoders 115 may be denoising autoencoders. In other words, the training module 130 may generate a corrupt input by setting some fraction f of the pixels in the image to zero (or alternatively to high values). This corrupted input is provided to the autoencoder along with the uncorrupted input and the autoencoder learns to reproduce the uncorrupted input from either. For example, the autoencoders may minimize reconstruction error from the corrupt and uncorrupt input using Euclidean loss.

In some implementations, the training module 130 may train one autoencoder 115 for each zoom level. For example, a lowest zoom level may represent the entire content item, e.g., a screenshot of the entire user interface. The screenshots (and corrupt versions of the screenshots) may be provided to a first autoencoder 115a, which learns to extract useful features from the images. The training module 130 may train a second autoencoder 115b on a highest zoom level, which represents just the pixels that correspond with a particular UI element. These cropped images may be provided to the second autoencoder 115b (along with corrupt versions of the cropped images), and the second autoencoder 115b learns useful features for the element level. The training module 130 may also train a third autoencoder 115c on an intermediate zoom level. The intermediate level represents more than the element but less than the entire screenshot. The third autoencoder 115c learns to extract useful features for the intermediate zoom level. If other zoom levels are used to generate feature vectors, the training module 130 may train additional autoencoders 115. In some implementations, the autoencoders 115 may share the same architecture, but have different parameter values. In such implementations, the input images for the autoencoders may be resized, so that each input image, regardless of zoom level or aspect ratio, is the same size. For example, each input may be resized to 288×162. Although the training module 130 trains a full autoencoder 115, as explained herein, the content saliency neural network 110 may use the output of the encoder portion of the autoencoder 115 as input. This reduces the dimensions of the input for the content saliency neural network 110 without sacrificing quality.

The content saliency neural network 110 is trained to provide a saliency score for an element of a content item. In some implementations, the content saliency neural network 110 is a component of a content saliency module 116. In some implementations, the content saliency neural network 110 (not shown) is separate from, but operably coupled to/accessible by the content saliency module 116. The content saliency module 116 may be configured to receive a content item, e.g., a training content item or a draft content item, identify or determine the elements of the content item, and generate context feature vectors for each identified element. To identify the content elements, the content saliency module 116 may use computer code if the content item is a user interface, a DOM tree if the content has a mark-up language (e.g., HTML) format or something similar. The content saliency module 116 may also use data provided by a user that identifies or tags areas of the content item as elements. In some implementations, the content saliency module 116 may convert the content to an image for further processing, if the content item was not provided in an image format.

The content saliency module 116 may include saliency feature generator 112. The saliency feature generator 112 may be a module or engine that is incorporated into the content saliency module 116 or may be separate from, but work with, the content saliency module 116. The saliency feature generator 112 may generate at least three feature vectors for each element of a provided content item. If called from the training module 130, the saliency feature generator 112 generates the feature vectors for a training content item. Otherwise, the saliency feature generator 112 generates feature vectors for a content item being developed/drafted. A feature vector is an array of numbers. The numbers may be integers or floating point numbers. The first feature vector is a vector of simple features. A simple feature represents a characteristic or attribute of the content element, such as color, width, height, area, position within the content item, etc., of the element. The color may be represented by color moments, e.g., first color moment and second color moment, for each of the three color channels. A color moment characterizes color distribution in an image. In some implementations, color moments are computed per channel (e.g. 6 moments). For example, the first color moment is analogous to mean (M) and can be expressed as $$M_i = \sum_{j=1}^{N} \frac{1}{N} p_{ij}$$

where N is the pixels in an image, $p_{ij}$ is the value of the $j^{th}$ pixel in the $i^{th}$ color channel. The second color moment is analogous to the standard deviation a and can be expressed as $$\sigma_i = \sqrt{\frac{1}{N}\sum_{j=1}^{N}(p_{ij}-M_i)^2}.$$

Each attribute may be represented by one or more positions in the array. For example, the width may be represented by one array position while the color may be represented by multiple, e.g. six, array positions.

Figure 8:
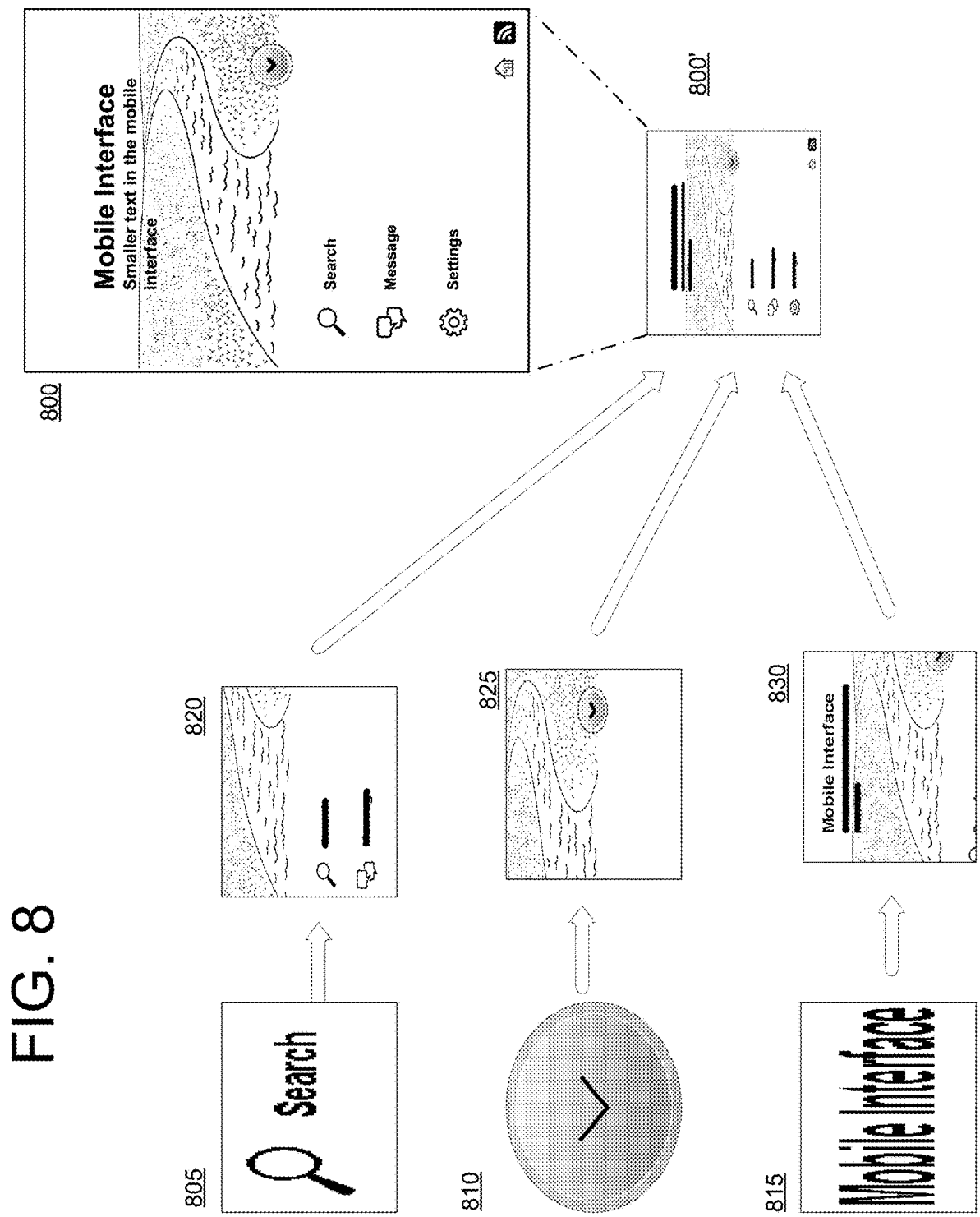
FIG. 8 is an illustration of example elements included in a content item and the various resolutions used to generate context feature vectors for the saliency neural network, according to one example.

The remaining vectors generated by the saliency feature generator 112 are referred to as context vectors. The context vectors represent saliency data for the element at various zoom levels. The saliency feature generator 112 may use an image of the content, e.g., generated by the content saliency module 116, to obtain the context feature vectors. The saliency feature generator 112 may generate a context vector for at least two zoom levels for each element. Each zoom level represents some level of context for the element. A highest zoom level is the element. This zoom level represents low context for the element because it does not include any, or very little, context information from the content outside of the element itself. A lowest zoom level is the content item. This represents high context for the element, as it includes all or almost all content from the content item. In some implementations, the saliency feature generator 112 may include one or more intermediate zoom levels. This represents intermediate context for the element, as it includes some content outside the element itself but less than all or almost all content from the content item. For example, one intermediate zoom level may represent an area that is half-way between the element itself and the edge of the content item. This resolution may be determined by a half-way point on each side of a bounding box for the element. A bounding box is the smallest shape, typically but not always, a rectangular box that encloses the entire element. FIG. 8 illustrates the different zoom levels for three of nine elements in content item 800. The element 805 is a highest zoom level, representing the element itself. Intermediate resolution 820 represents an intermediate zoom level for element 805, and the full content item 800 (e.g., an entire screenshot of a user interface) represents a lowest zoom level for element 805. Similarly, element 810 has a highest zoom level that is the element 810 itself, an intermediate resolution of 825, and a lowest zoom level represented by content item 800. As the zoom level decreases, more context information is included.

In some implementations, the context vectors are generated by the autoencoders 115. The input to the autoencoders may be resized so that each image, regardless of zoom level or aspect ratio, is the same size, e.g., has the same dimensions. The example elements of FIG. 8 illustrate resized inputs, e.g., 805, 820, and 800' have the same size even though they each represent a different area of the original content item 800 (e.g., original user interface screenshot). FIG. 8 also demonstrates that the aspect ratio is not preserved. The autoencoders each receive an input representing the element's zoom level for which it was trained. For example, the saliency feature generator 112 may provide an image corresponding to item 800' to autoencoder 115a (e.g., the lowest zoom level) and autoencoder 115b may receive an image corresponding to element 805 (e.g., the highest zoom level). In implementations where a third context vector is used, the saliency feature generator 112 may provide an image corresponding to intermediate resolution 820 to autoencoder 115c (e.g., an intermediate zoom level). When implementations include more than one intermediate context, the saliency feature generator 112 may provide an additional autoencoder with a corresponding image. The saliency feature generator 112 obtains the output from the encoder portion of the autoencoders 115 as the context feature vector. For example, if the input image has dimensions 288×162×3 then the context feature vector may be 32×18×16 after the encoder has processed the data. The saliency feature generator 112 may provide the output of the encoder portion of the autoencoders 115 for each zoom level and the simple features as input to the content saliency neural network 110.

In some implementations, the context vectors are generated by pixel saliency neural network 120. The context vectors generated by the pixel saliency neural network 120 may also be referred to as pixel-level vectors. In such implementations, the saliency feature generator 112 may use the zoom levels identified above, but may not resize the images prior to providing the images to the pixel saliency neural network 120. For example, the saliency feature generator 112 may generate a first context vector for the entire content item. In other words, the first context vector may represent data for an image of the entire content item, e.g., an image corresponding to content item 800 of FIG. 8. The second context vector may be for the element and a third context vector for an intermediate image that includes more than the element but less than the entire content item. The saliency feature generator 112 may provide the image corresponding to the zoom level to the trained pixel saliency neural network 120. The pixel saliency neural network 120 may be a deep neural network trained to provide saliency data for pixels of an image. The pixel saliency neural network 120 may be trained on a large collection of natural images. Natural images do not generally include text and instead are mostly images of places, people, and objects. In contrast, content, as used herein, is mostly text-based, e.g., user interfaces, email, etc., meant to convey textual information, although content items may also include natural images. An example of a pixel-level saliency neural network is SalNet developed by J. Pan et al. The pixel saliency neural network 120 may take as input an image and provide as output a feature vector for the input. The feature vector obtained from the pixel saliency neural network 120 represents a pixel-level saliency matrix of the input image. The saliency matrix is a pixel-by-pixel representation of the image. Each pixel can have a value that represents the salience of the pixel within the image. In some implementations, the value may be between 0 and 255, in which higher numbers correspond to higher salience. In some implementations, the pixel-level saliency matrix may be a two dimensional matrix, e.g., 80×45. This matrix is the context feature vector for the image representing the zoom level of the element. The saliency feature generator 112 may generate a context feature vector for each zoom level of each element in the content. Thus, for example, each element has a first pixel-level vector for the lowest zoom level, a second pixel-level feature vector for the highest zoom level, and optionally a third pixel-level vector for an intermediate zoom level. In some implementations, the saliency feature generator 112 may obtain the context feature vector from the penultimate layer convolutional layer of the pixel saliency neural network 120.

In some implementations, the saliency feature generator 112 may generate the context feature vectors using the autoencoders 115 and the pixel saliency neural network 120. For example, the saliency feature generator 112 may concatenate the vector from the autoencoders 115 with the vector from the penultimate convolutional layer of the pixel saliency neural network 120 for each zoom level and provide this as input to the content saliency neural network 110.

Whether obtained via the autoencoders 115, the pixel saliency neural network 120, or a combination of these, in some implementations the saliency feature generator 112 may stack the feature vectors depth-wise to generate a feature vector of three dimensions. The saliency feature generator 112 returns the context feature vectors and the vector of simple features for each element of the content item.

The training module 130 uses the context features and simple features from the training content items 132 to train the content saliency neural network 110. In some implementations around 300 training content items 132 may be used to fully train the content saliency neural network 110. Of course, fewer or more training content items may be used, although quality of the prediction suffers if not enough training content items 132 are used. The training includes providing, for each element of each training content item, a training example. The training example includes the context feature vectors (e.g., two or three context feature vectors, one at each of two or three zoom levels), the vector of simple features, and the saliency score for the element. The saliency score for the element represents ground truth for that element of the content item, as calculated using the eye gaze data. The training enables the neural network 110 to learn weights for the mapping function so that given the input (the feature vectors), the content saliency neural network 110 provides the desired output (ground truth for the input). In other words, training is using the training examples to let the neural network, over a series of iterative training rounds, determine optimal weight values in the mapping function that results in the neural network outputting the ground truth for a training example. In some implementations, the content saliency neural network 110 may apply an element-wise activation function in the final layer, treating the element-wise predictions as probabilities for independent binary random variables. In such implementations, the content saliency module 116 can apply a binary cross entropy (BCE) loss function between the predicted element-wise saliency map and the corresponding ground truth. In some implementations, other loss functions, such as mean square error, Euclidean, or cross-entropy loss may be used to learn to predict the ground truth.

Once trained, the content saliency neural network 110 is ready to be used in an inference mode. In an inference mode, the content saliency neural network 110 takes as input the feature vectors for a content element and provides, in return, a saliency score for the element. The saliency score represents the saliency probability for the element. In some implementations, the probability may represent a number between zero and one inclusive. In an inference mode the content saliency neural network 110 may be available for making predictions for unseen content elements, e.g., user interfaces that are currently under development. In some implementations, the content saliency neural network 110 may be accessed at a server, e.g., computing device 102. A content creator 158 may use computing device 150 to access the content saliency module 116 via network 140, for example. In some implementations the content saliency neural network 110 may be pushed or downloaded to a client device, such as computing device 150. The computing device 150 may store a local copy 154 of the content saliency neural network. In some implementations, components of the content saliency module 116 may also be pushed or downloaded to the computing device 150 as content saliency module 156. Content saliency neural network 154 functions the same as the content saliency neural network 110, so reference to one in an inference mode is considered a reference to either. Likewise, components of the content saliency module 156 function the same as the components of the content saliency module 116, so reference to one can be considered reference to either in this disclosure. For ease of discussion, reference will be made to content saliency module 116 and content saliency neural network 110.

In some implementations, the content creator 158 may access the content saliency module 116 as part of a content design program. In other words, the functionality of the content saliency module 116 and content saliency neural network 110 may be a tool in a content design program, such as ADOBE XD CC, DREAMWEAVER, ADOBE ACROBAT, ADOBE CAMPAIGN, ADOBE AEM, etc.

Figure 9:
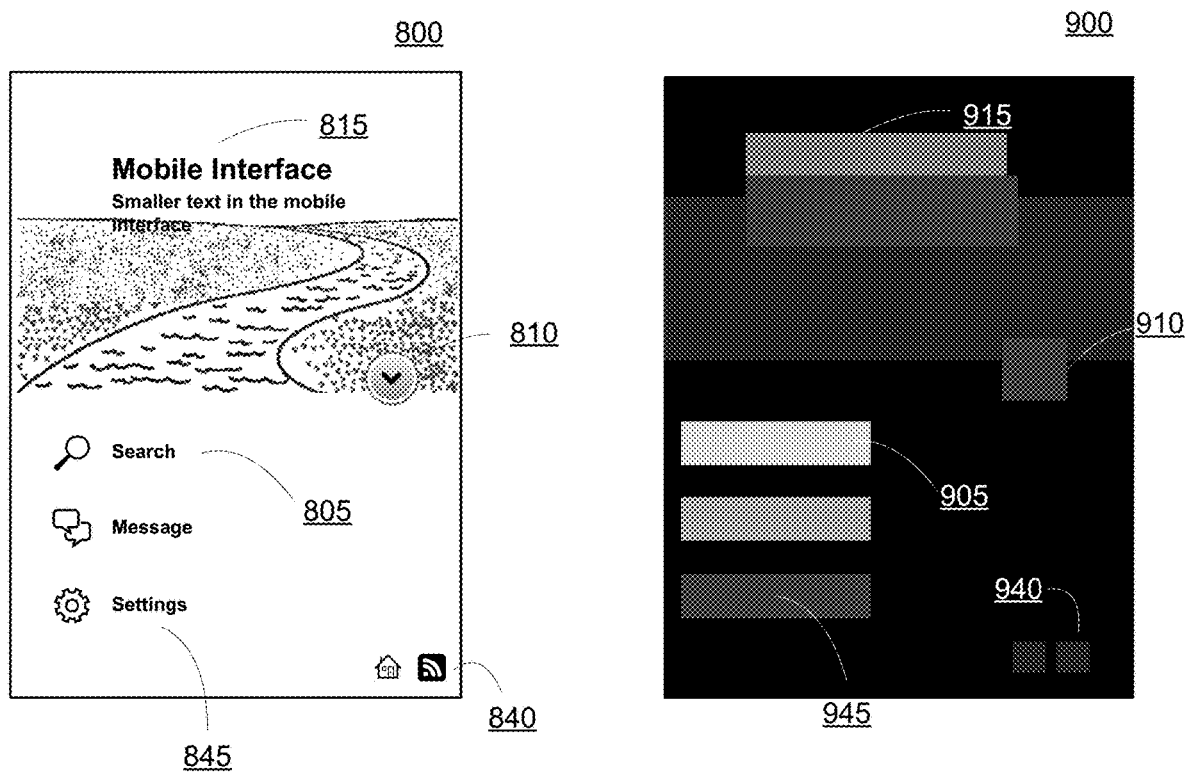
FIG. 9 illustrates an example saliency map for the content item illustrated in FIG. 8, according to one example.

The content saliency module 116 may receive a draft content item from a content creator 158, e.g., using computing device 150. The content saliency module 116 converts the content to an image, identifies the elements in the content, and computes context feature vectors for each element, as described above. The content saliency module 116 provides the feature vectors for each element to the content saliency neural network 110, which provides a saliency score for each element. The content saliency module 116 converts the saliency scores for the content elements into a saliency map, e.g., using saliency map generator 114. Although shown as part of the content saliency module 116, saliency map generator 114 may be a separate component in communication with the content saliency module 116. A saliency map shows the elements in a content item represented by their respective saliency scores. In some implementations, the saliency map may be a heat map, which uses differing colorations representing different ranges of saliency scores. For example, white may represent a top 10% of saliency scores, dark gray may be a bottom 10% and other varying shades of gray may represent ranges in the middle. As another example, red may represent top 10%, orange the previous 10%, etc. and a bottom 10% being represented by deep purple. Coloration may also include patterns used to represent the saliency score ranges. Of course the particular coloration is not limiting. FIG. 9 illustrates an example saliency map 900 for content item 800. Lighter areas in FIG. 9 represent greater saliency.

Figure 2:
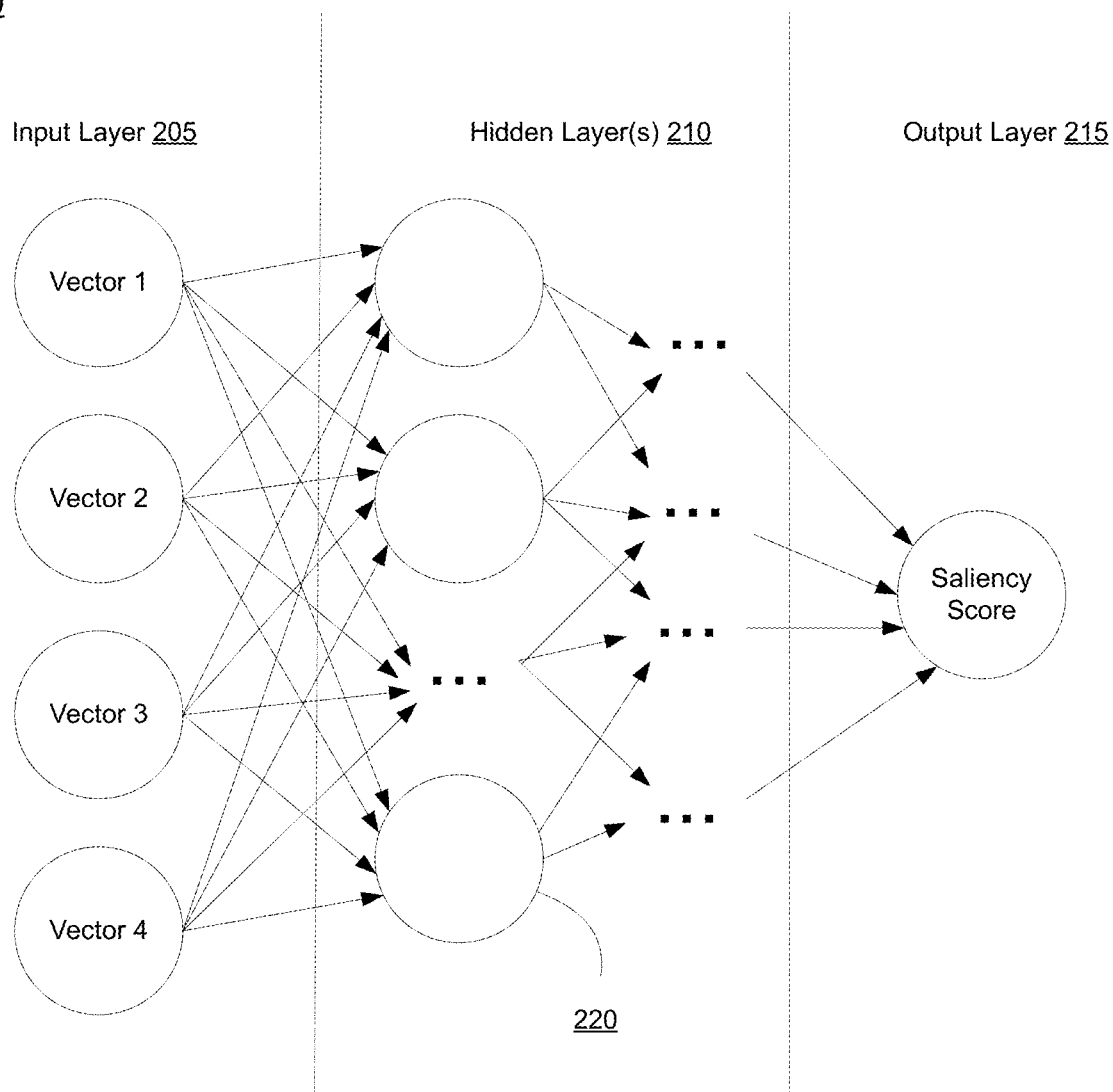
FIG. 2 is a block diagram of example inputs and output for a saliency neural network, according to an implementation.

FIG. 2 is a block diagram of an example content saliency neural network 200, according to an implementation. The example network 200 is one example of the content saliency neural network 110 of FIG. 1. Other implementations may include a configuration different from the configuration described by network 200. For example, other implementations may include additional inputs, additional hidden layers, or additional nodes in the hidden layers. Such additional hidden layers may be fully connected or convolutional.

In the example network 200 of FIG. 2, the content saliency neural network has an input layer 205, hidden layers 210 and an output layer 215. The input layer 205 includes four inputs. The four inputs represent a vector of simple features for the element, and three context feature vectors, each representing a different zoom level for a content element. For example, a first context feature vector may be for the entire content item, a second context feature vector may be for the element itself, and a third context feature vector may be for an intermediate zoom level. Of course other implementations may use additional zoom levels adding additional context feature vectors, or may not include the intermediate zoom level context feature vector.

The network 200 also includes hidden layers 210. The neural network 200 is a deep neural network that includes several hidden layers 210. The hidden layers 210 can include a number of neurons 220, e.g., 40, 100, 275, 500, etc., neurons. The number of neurons can vary across hidden layers. Each neuron 220 receives the input from the input layer 205. In other words, the neurons 220 are fully connected to the input layer 205. In some implementations the neurons 220 may be rectified linear units (ReLU). In other words, the hidden layers 210 may have ReLU activation. Although only one layer is illustrated, it is understood that there may be many hidden layers and each layer may include different numbers of nodes. The layers may be convolutional or fully connected. The output layer 215 is a single neuron that outputs the predicted saliency score for the content element.

Figure 3:
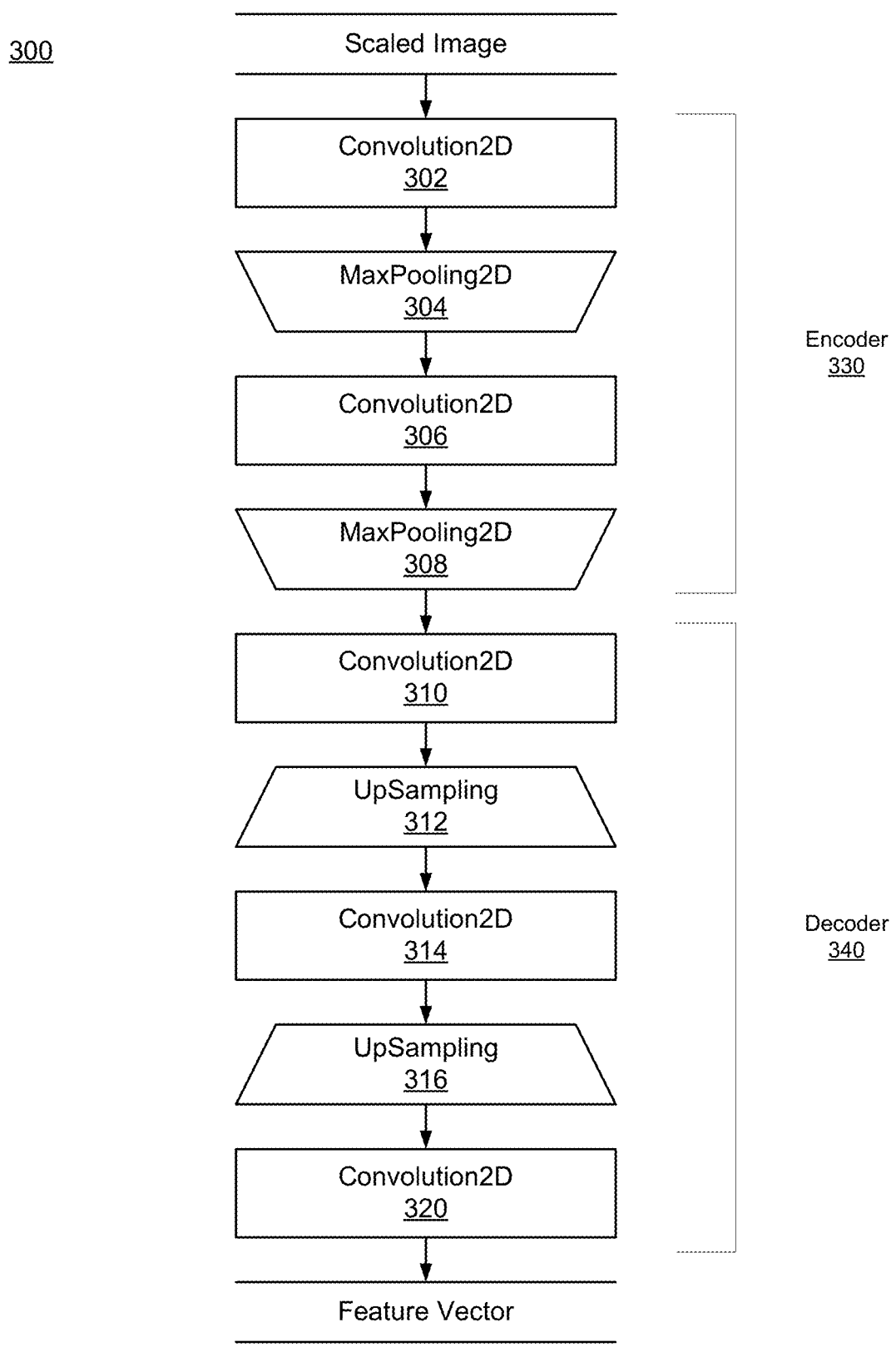
FIG. 3 is a block diagram of an example autoencoder neural network configuration, according to an implementation.

FIG. 3 is a block diagram of an example autoencoder 300 neural network configuration, according to an implementation. The example autoencoder 300 is one example of an autoencoder 115 of FIG. 1. Other implementations may include a configuration different from the configuration described by autoencoder 300.

The autoencoder 300 takes as input an image. The image represents some portion of the content item, e.g., a crop of an element, an intermediate crop of the content item that includes the element, or an image of the entire content item. The image region of each crop, i.e., each zoom level, is resized so that each image has the same scale. Thus, the original image size, prior to being provided to the autoencoder 300, does not matter, and the aspect ratio need not be preserved. The autoencoder 300 has five convolutional layers. The encoder 330 portion of the autoencoder 300 includes the first two convolutional layers with max pooling after each convolutional layer. Max pooling layers are used to reduce the size of the input. In one example implementation, the convolutional layer 302 has 3 filters with size 3×3 and a stride of one and the convolutional layer 306 has 16 filters of size 3×3 and a stride of one. The encoder 330 is followed by decoder 340, which includes three more convolutional layers with size 3×3 and a stride of one. Convolutional layer 310 has 16 filters, convolutional layer 314 has 32 filters and convolutional layer 316 has 3 filters. The example autoencoder 300 includes upsampling layers 312 and 316. The upsampling layers may also have a size of 3×3. In some implementations, all convolutional layers may use ReLU activations. In the example of autoencoder 300, the encoder 330 may convert a 288x 162×3 input image into a 32×18×16 encoded context feature vector. As indicated earlier, a separate autoencoder 300 may be trained on each crop size, i.e., each zoom level. Because a separate autoencoder 300 is trained on each zoom level, the system may obtain the context feature vectors in parallel. In other words, the autoencoders for each zoom level can be executed in parallel. Of course, autoencoder 300 is one example and other configurations for the autoencoder may be used.

Figure 4:
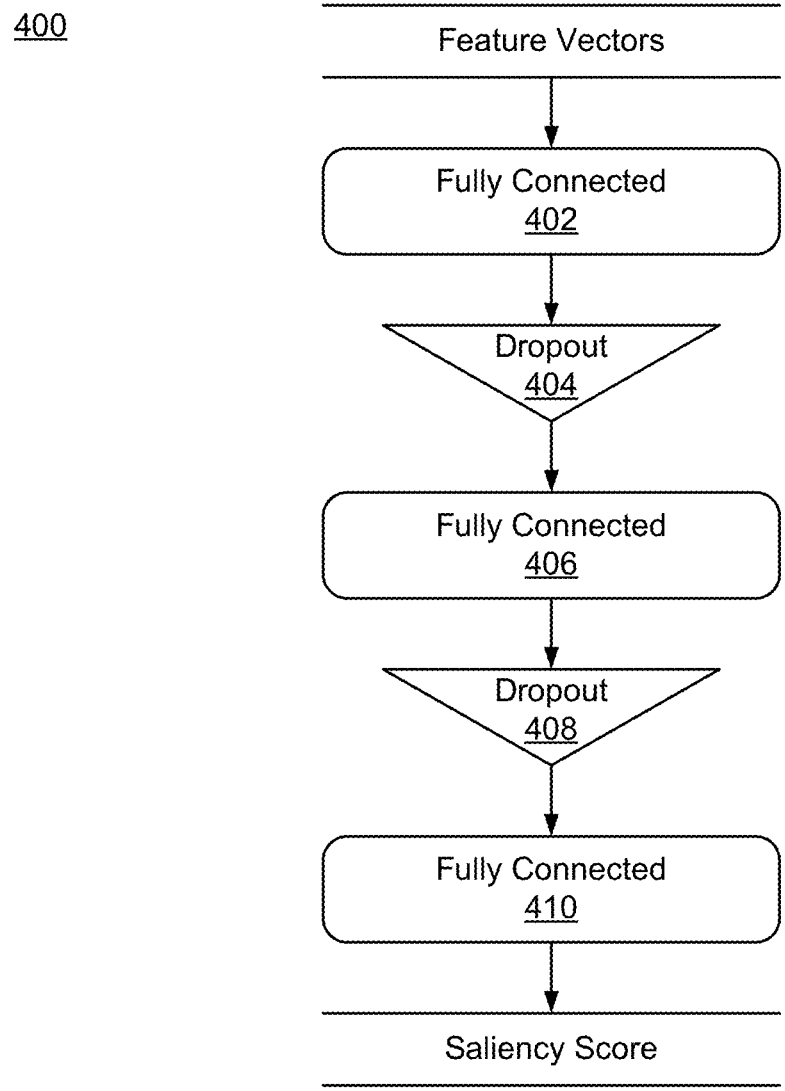
FIG. 4 is a block diagram of an example saliency neural network configuration, according to an implementation.

FIG. 4 is a block diagram of an example content saliency neural network 400 configuration, according to an implementation. The example network 400 is one example of the content saliency neural network 110 of FIG. 1. Other implementations may include a configuration different from the configuration described by network 400.

The content saliency neural network 400 takes as input feature vectors for a content element. The feature vectors represent simple features and context features. The context features may be feature vectors taken from the encoder portion of an autoencoder, such as autoencoder 300 of FIG. 3, at different zoom levels for a content element. In some implementations, the encoded vectors from the autoencoders may be concatenated before being provided to the content saliency network 400. The context features may also be a matrix of numbers representing pixel level saliency of the zoom levels, e.g., from a penultimate layer of a pixel-saliency neural network. In one example, the matrix may have a dimension of 80×45. In some implementations, the context feature vectors may be stacked, e.g., so that the context feature vectors are provided as a three dimensional vector to the content saliency neural network. In some implementations, the simple features are concatenated with the context features before being provided to the content saliency neural network 400. The feature vectors, e.g., the simple features and the context features, are provided to a fully connected layer 402. In the example configuration of FIG. 4, the content saliency neural network 400 may include three fully connected layers with a dropout layer in between each fully connected layer. Dropout layers are used in between every pair of dense layers, i.e., the fully connected layers, in order to prevent over-fitting. In some implementations, the fully connected layers use ReLU activation (for efficiency). The output of the last fully connected layer 410 is a saliency score for the content element. The system, e.g., saliency map generator 114, may use the saliency scores of all the elements in a content item to generate a saliency map for the content item. For example, each user-interface element may be given a saliency score and a saliency map of the user interface provided to a UI designer. Of course, network 400 is one example and other configurations may be used.

Figure 5:
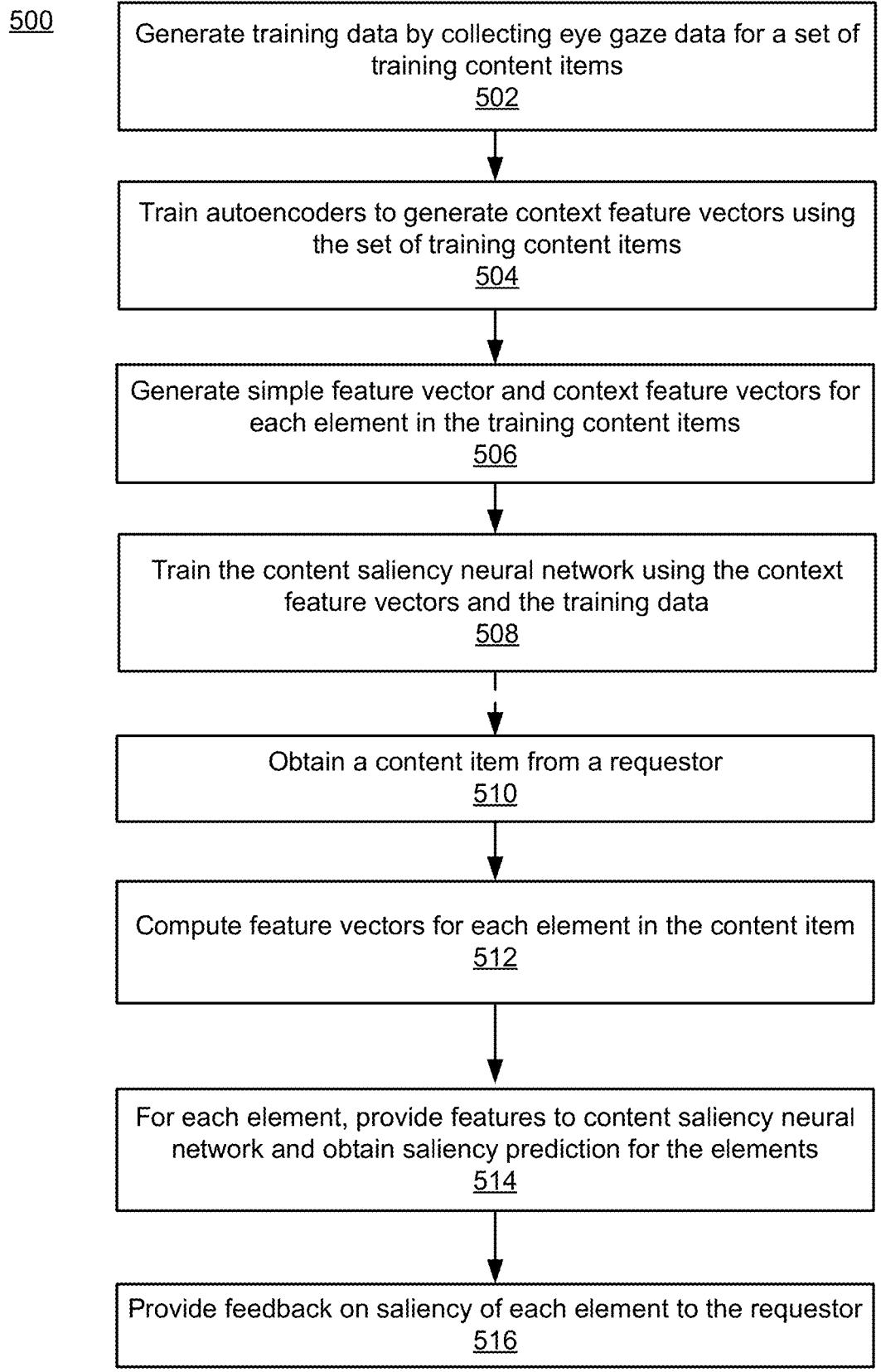
FIG. 5 is an example flowchart illustrating an example process performed by the system of FIG. 1.

FIG. 5 is an example flowchart illustrating an example process 500 performed by the system of FIG. 1. Process 500 may be performed by a system such as system 100 of FIG. 1. Process 500 trains a content saliency neural network to predict a saliency score for a given content element, e.g., represented by feature vectors. Process 500 uses the content saliency neural network to generate a saliency map that illustrates which elements are salient in the content item. Thus, the content saliency neural network provides a new tool to a content creator to more quickly and with more accuracy lay out a content item to maximize desired information exchange.

Process 500 includes generating training data by collecting eye gaze data for a set of training content items (502). This process is described in more detail below with regard to FIG. 6. In some implementations, the system may train autoencoders to generate context feature vectors using the set of training content items (504). The autoencoders are neural networks that learn to identify key features in an image. When autoencoders are trained to re-create the content items represented by the training content items, the autoencoders learn to identify key features and include those features in the encoded output. In some implementations, the autoencoders may be denoised. Denoised autoencoders are trained on noisy, or corrupted, versions of the input and trained to provide an uncorrupted version of the output. For example, some fraction f of the pixels in an input image may be set to low values (e.g., 0) or high values (e.g., 255). This introduces noise in the input image. The system may train the autoencoder to reproduce, with as little error as possible, the input image from either the original image or the corrupted image. Once trained, the output of the encoder portion of the autoencoder can be used as a context feature vector, as it represents the most useful features of an input. The system may train one autoencoder for each of two or more zoom levels. The zoom levels represent differing amounts of context information for each element in a content item. The highest zoom level is the element itself, the lowest zoom level is the entire content item, and intermediate zoom levels fall between. Each zoom level may thus have a respective autoencoder. The input images to each of the respective autoencoders may be resized, so that each autoencoder takes in the same size image and, thus, has the same architecture. In training the autoencoders, some of the training content items may be used for training and some of testing (e.g., not used to train but used to evaluate the quality of the autoencoder during training).

The system may generate feature vectors for each of the elements in each of the training content items (506). The feature vectors include a simple feature vector and at least two context feature vectors. The simple feature vector is based on features of the element, such as width of the element, height of the element, area of the element, position of the element within the content item, color distribution (such as the first and second color moment for each color channel), etc. The area and position may be useful because resizing the original image of the element (e.g., for input into the autoencoder) may distort the area and position. The context feature vectors represent context information at varying zoom levels, including a highest zoom level (the element) and a lowest zoom level (the content item). At least one intermediate zoom level may also be used. The generation of feature vectors is described below in more detail with regard to FIG. 7. Each vector set-saliency score pair for an element is a training example for the content saliency neural network. The feature vectors represent the input and the saliency score the desired output given the input.

The system may train a content saliency neural network using the feature vectors (508). During the training mode the content saliency neural network learns how to predict the given saliency score for a content element given the feature vectors for that element. This may be done over a number of iterative rounds. For example, the same training data (e.g., the feature vectors for all the elements in the set of training content items and the respective saliency score for each element) may be used over 8,000, 15,000, 25,000, 40,000, etc. rounds. With each round the neural network adjusts weights of the mapping function so that the predictions get closer to matching the saliency score. Training ends after a number of predetermined rounds or after the predictions converge with the ground truth, e.g., are within an acceptable range of the ground truth. Once the content saliency neural network is trained, it is ready for use in an inference mode, or in other words to being making predictions for unseen content elements.

After the content saliency neural network is trained, the system may receive a content item from a requestor (510). The requestor may be a content creator and the request may be made by a process used by the content creator. The content item is a draft version of the content, meaning the content creator has not finalized the content. Put another way, a draft content item is a content item that has not yet been viewed by the intended recipient. The content item can be, for example, a user interface of a mobile application and the content creator a developer. The system computes feature vectors for the elements of the content item (512). This process is described in more detail below, with regard to FIG. 7. The system may, for each element of the content item, provide the features to the content saliency neural network as input and obtain a saliency score for the element from the content saliency neural network (514). The system may then provide feedback on the saliency of each element in the content item to the requestor (516). In some implementations, this may include generating a saliency map. In some implementations, prior to generating the saliency map the system may normalize the saliency scores for the elements in the content item so that the sum of all saliency scores equals one. The saliency map recreates the layout of the content item but with the area corresponding to each element replaced with a bounding box having a coloration that is dependent on the saliency score for the element. In other words, each element is replaced with a shape that has an appearance that corresponds with the saliency score for the element. For example, elements with a high saliency score may be white, elements with a low saliency score may be dark gray, and elements with a medium saliency score may be light gray. As another example, elements with a saliency score in the top 10% may be red, elements with a saliency score in the 11-20% range may be orange, elements with a saliency score in the 21-30% range may be yellow, etc., with elements in the bottom percentages dark purple, or black. Of course other colorations, including different patterns, may be used. In some implementations, the feedback may include changing some other aspect of the content item, such as drawing a yellow box around the most salient elements, the color of the border of the box being dependent on the saliency score. As another example, the system may simply provide the saliency score for each element and a requesting process may produce a graphic or visual or an alert for the content creator. Process 500 then ends.

A content creator may repeat steps 510 to 516 many times. In some cases the content creator may perform steps 510 to 516 for two versions of the same content item, which enables the content creator to see a side-by-side comparison, e.g., side-by-side saliency maps of the two versions. Such comparisons are not only much faster than obtaining human feedback, but also more accurate, as the subjective opinion of human reviewers does not reflect objective eye gaze data.

FIG. 6 is an example flowchart illustrating an example process 600 for generating training data to train a content saliency neural network, according to an implementation. Process 600 may be performed as part of step 502 of FIG. 5. Process 600 obtains data from which the system can generate training examples for training the content saliency neural network, e.g., network 110 of FIG. 1.

Process 600 begins by obtaining a set of training content items (602). The set of training content items are referred to as historical content items, e.g., content items that have already been seen by viewers. For example, the content items in the set of training content items may be screenshots of mobile applications available for download and installation from an app store. Of course other types of content items may be used, such as emails from advertising campaigns, promotional pamphlets, brochures, posters, documents, etc. The training content items are text-based, e.g., communicating a message with words. In some implementations, the set of training content items may include hundreds, e.g., around 300, training content items. Fewer content items may be used but may negatively affect the quality of the saliency prediction. More training content items may also be used. Increasing the number of training content items may increase the cost of generating the training examples and of training the content saliency neural network. The training content items include a variety of examples of design. For example, mobile applications with differing download rates and differing user ratings may be selected. The training examples may include a few, e.g., two to three, different screenshots from the mobile application. The more variety in terms of look that is represented by the training content items, the more accurate the trained neural network will be. The variety can represent popular content items as well as unpopular content items. Whether a content item is popular may be determined by human raters, by the statistics associated with a mobile application in the app store, by results of an advertising campaign, etc.

The system may generate and issue a series of crowd-source tasks designed to obtain a plurality of video streams for each of the content items in the set of training content items (604). The crowd-source tasks are performed by workers. For example, a worker may sign up to perform tasks offered by crowd-source websites, such as MECHANICAL TURK. Each crowd-source task may include showing one of the content items to the worker and recording the worker as the worker views the content item. The recording may be made with a front-facing or web camera as the worker views the display. In some implementations, each task may involve showing the worker a plurality, e.g., 10, 12, 15, etc. of the training content item, so that one worker provides a video stream for each one of the plurality of training content items in that task. Each worker may get a different set of content items in her respective task. The crowd-source tasks may be designed to gather a plurality of video streams, e.g., 8, 15, 20, etc., for each content item, each video stream being for a different worker. In some implementations, filler images are interspersed with the training content items. This can reduce the spatial bias of previous training content items. Filler images may be natural images. Video need not be recorded when a filler image is displayed.

In some implementations, the crowd-source task may include a calibration task. The calibration task may be performed by each user at the start of each session, to make the eye gaze predictions more accurate. The calibration task may include displaying a moving object at different portions on the screen for a predetermined amount of time (e.g., over 20 seconds). The worker may be instructed to follow the object as it moves on the screen and a video of the worker's eyes may be recorded during the calibration task. Because the location of the object is known, the video can be used to make the eye gaze data obtained during the other tasks more accurate, e.g., by reducing the average error. In some implementations, the average error may be reduced by several centimeters, e.g., from 3.5 cm to 1.4 cm. In some implementations, the calibration task may enable the system to train a linear regression model to predict the actual coordinates of the object given the gaze points predicted by an eye-tracking neural network, such as iTracker.

The system may receive the video streams (606) and associate each video stream with its respective content item. The system may generate gaze points for frames of the video stream that fall within the first n seconds (608), n being a predetermined number. To generate the gaze points the system may process each video stream to determine, for each frame of video, where on the display the worker is looking. This point is called a gaze point and can be represented by an x,y coordinate. The gaze points for n seconds of video may be captured and stored for each training content item. Thus, the system may store, for each video stream of each training content item, a set of eye gaze data. For example if each content item has ten corresponding video streams, the system generates ten sets of eye gaze data for each content item. The system may only determine and/or store the eye gaze data for the frames of the video stream that fall within the first n seconds.

The system also determines what elements exist for each of the content items in the set of training content items (610). The system may determine the elements at any time before step 612. The elements in each training content item may be determined automatically, e.g., via computer code or a DOM tree or similar structure. For example, the underlying XML code for a screenshot may be obtained using computer programming tools, such as debugging tools. From the XML computer code (or similar computer programming languages) the system may identify various elements appearing in a mobile application user interface. In some implementations, a human may identify the elements, e.g., via express selection and/or labeling.

The system may calculate a saliency score for each element of each content item in the training set of content items using the eye gaze data for the content item (612). In some implementations, the system may use gaze points predicted by a calibrated eye tracking neural network to calculate the probability of a fixation point falling on a pixel in the training content item (e.g., the screenshot of the mobile application user interface). For example, a 2-dimensional co-variance matrix may be generated during calibration and used in Gaussian blurring of the fixations maps for each content item viewed by the worker. This results in a probabilistic heat-map from the fixation points. The system may convert the fixation points to a continuous distribution to allow for uncertainty in the eye-tracking ground truth measurements to be incorporated. The system may convert this pixel-level heat map into element-level heat maps. For example, the system may compute the integral of the pixel-level saliency density over the area covered by an element. In some implementations, the system may normalize the predicted saliency score of all elements in each historical content item so that the total saliency for the content item is one (1). Put another way, the system may normalize the saliency scores for the elements of a content item so that the scores of all the elements sums to one (1). When one element overlaps another element in the content item, the system may assign the saliency of the pixels in the overlapping regions to the element on top. The saliency score for an element is also referred to as the ground truth for the element because the score is based on actual eye gaze data and not a subjective opinion. Once the system determines a saliency score for each element of each historical content item, process 600 ends, having identified the elements in each content item and calculated a ground truth saliency score for each element.

Figure 7:
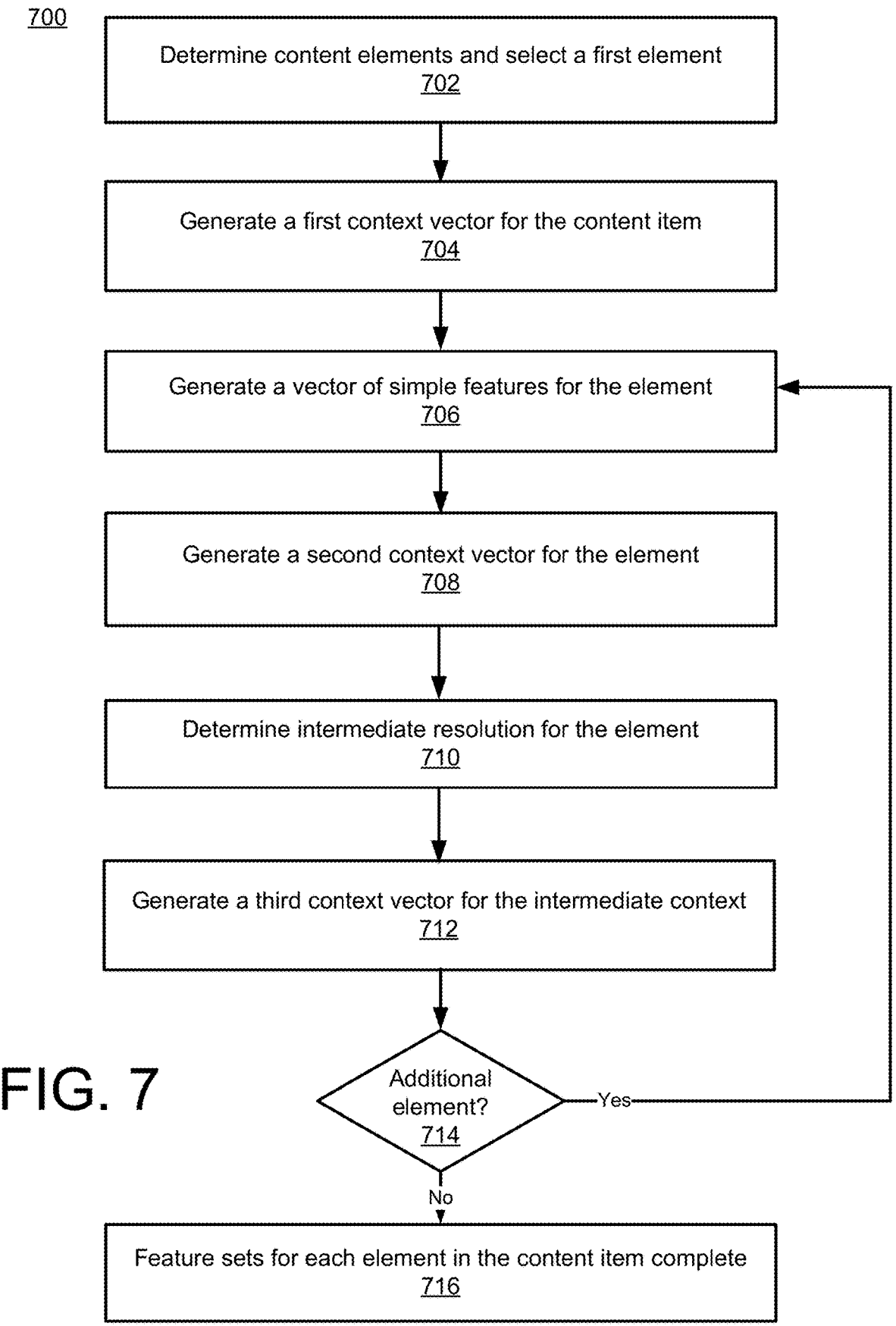
FIG. 7 is an example flowchart illustrating example process for generating feature vectors for input to a saliency neural network, according to an implementation.

FIG. 7 is an example flowchart illustrating an example process 700 for generating input feature vectors for input to a content saliency neural network, according to an implementation. Process 700 may be performed as part of steps 506 or 512 of FIG. 5. Process 700 takes as input a content item, e.g., a screenshot of a mobile application user interface, determines which elements are present in the content item, and computes a set of feature vectors for each element in the content item.

Process 700 begins by determining the elements of the content item (702). In some implementations, the content elements may be identified or tagged as such by a user. For example, a user, such as the content creator or the system administrator setting up the training content items, may use a graphical user interface to draw a bounding box around each element in the content item. The bounding box need not be rectangular, but can be drawn free-hand or circled, etc. Rectangular may be the most common selection because the content items are primarily icon/text-based. In some implementations, the system may automatically (e.g., without user input) determine the elements based on code or tags associated with the content. For example, the system may use computer code, such as XML, associated with a user interface to determine which elements appear in the user interface of a mobile application. The computer code may be obtained, e.g., via debugging tools or directly from the content creator. As another example, content that is based on a mark-up language, such as HTML, may include tags that surround each object. For example, a paragraph in an email may be marked by a paragraph tag <p>, a list by a list tag <ul>, an image with an image tag <img>, a table with a table tag <table>, etc. Such tags may be used to designate content elements. In some implementations, the system may use a DOM tree to identify elements. In general, an element is any object on which the content creator can take action. Once the elements of the content item have been identified, the system may select a first element.

The system generates or computes a first context vector for the content item (704). Because this is the lowest zoom level, in some implementations, this feature vector can be computed once and used for each element. In some implementations, it may be computed for each element. Computing a context vector may be accomplished via transfer learning. In transfer learning one neural network is used to generate input for another neural network. In some implementations, the context vector may be obtained from the encoder portion of a specially trained autoencoder. The autoencoder may have been trained to encode and reproduce content items. The autoencoder takes as input an image of the content item and provides, as the output of the encoder, a vector of encoded features. These encoded features are the first context feature vector. In some implementations, the input image may be resized to a common size before being provided to the autoencoder. In some implementations, the context vector may be generated using a pixel-level saliency neural network. The pixel-level saliency neural network may take as input an image and provide as output a two dimensional feature vector representing saliency scores for pixels in the input image. An example of a pixel-level saliency neural network is SalNet developed by J. Pan et al. The pixel-level saliency neural network does not work well for content items because it is trained on natural images and not text-based content. In some implementations, the output of the penultimate layer of the pixel-level saliency neural network may be used as the context feature vector. In some implementations, the output of the autoencoder may be concatenated with the output of the penultimate layer of the pixel-level saliency neural network and used as the context feature vector. The first context feature vector represents a lowest zoom level for the element, as the system cannot zoom out farther than the content item itself. Thus, the first context feature vector includes the most context information for the element.

The system may generate a vector of simple features for the element (706). The simple features represent low-level features of the element. For example, the simple features may include the length, width, height, area, position, etc. of the element. The area, width, and height may be included expressly because of the rescaling of elements before they are provided to the autoencoders. Position may be included to capture the user's bias towards elements at the top and left of the content item. In addition, the simple features may include information about the color of an element, e.g., the first and second color moments for each color channel. The first color moment of a color channel is analogous to the mean and the second color moment is analogous to the standard deviation. Other similar low-level features may be included in the simple feature vector.

The system may also generate a second context feature vector for the element (708). To generate the second pixel-level feature the system may provide an image that represents the element, by itself, to an autoencoder trained on rescaled images of elements from content items. For example, the element in a screenshot of a user interface may be rescaled and provided to an autoencoder. The output of the encoder portion of the autoencoder is the second context feature vector. In some implementations, the second context feature vector may be obtained from the penultimate layer of a pixel-level saliency neural network, e.g., by providing the image of the element to the pixel-level saliency neural network. In some implementations the output of the encoder may be concatenated with the output of the penultimate layer of the pixel-level saliency neural network and used as the second context feature vector. The second context feature vector represents a highest zoom level and includes no or very little additional context information.

In some implementations, the system may include a context feature vector for one or more intermediate zoom levels. In such implementations, the system may determine an intermediate resolution for the element (110). The intermediate resolution may be an image that includes the element and portions of the immediate surroundings of the element. In some implementations, the system may determine the immediate surroundings using a distance between the element and the edge of the content item. For example, the system may determine, for each side of a bounding box for the element, a mid-point between the side and the corresponding edge of the content item. The system may use these mid-points to determine an intermediate bounding box and any pixels from the image that fall within the intermediate bounding box may be included in the intermediate resolution for the element. In some implementations, the system generates a third context feature vector for the intermediate resolution. For example, the system may provide the intermediate resolution to an autoencoder. The system may resize the intermediate resolution image before being provided to the autoencoder. In this example, the output of the encoder portion of the autoencoder is the third context feature vector. In some implementations, the system generates a third context feature vector for the intermediate resolution using the pixel-level saliency neural network, as described above with regard to the other context feature vectors. The third context feature vector may also be a combination of output from the encoder and the pixel-level saliency neural network, as described above. The third context vector represents an intermediate zoom level and includes an intermediate level of context information, i.e., less than all (or almost all) but more than none (or almost none). In some implementations, the system may generate context feature vectors for more than one intermediate zoom level. For example, rather than finding the mid-point, the system may use a point one-third of the way between the edge of the element and the edge of the content item to determine the image used for a first intermediate resolution corresponding to the third context feature vector and may additionally determine a second intermediate resolution that uses a point two-thirds of the way between the edge of the element and the edge of the content item to determine an image used to generate a fourth context feature vector.

In some implementations, the system may optionally stack or concatenate the first context feature vector, the second context feature vector and the third context feature vector to generate a combined pixel-level feature vector. This combined pixel-level feature vector may be used as input into the content saliency neural network. If there are additional elements in the content item that do not have generated features (714, Yes), the system may repeat steps 706 to 712 for the next element. In some implementations, step 704 may also be performed for the next element. In some implementations, the system may use the first pixel-level vector generated for the first element. When features have been generated for all elements (714, No), the system has generated feature vectors for each element in the content item and process 700 ends.

FIG. 8 is an illustration of example elements 805, 810, and 815 included in a content item 800. FIG. 8 also illustrates the various zoom levels, also referred to as resolutions, used to generate the context feature vectors. In the example of FIG. 8, the system may generate a first context feature vector for the content item 800. This feature vector may be common for all of the elements in the content item. In some implementations, the content item 800 may be resized, e.g., as image 800', and provided to an autoencoder trained on content items. The aspect ratio of the content item 800 is not maintained in image 800'. In some implementations, the image of a content item 800 may be provided to a pixel-level saliency network.

The system may also generate a second pixel-level feature vector for each of element 805, element 810, and element 815, as well as the remaining elements that are not illustrated in FIG. 8 for the sake of brevity, such as the "settings" controls. The system may generate an image of the content item 800 and crop the image so that only the pixels in the image that correspond to the respective elements are left. In some implementations, this cropped image may be resized, as illustrated in FIG. 8. Thus, each element input image is of the same size. Aspect ratios are not maintained. The cropped and resized images may be provided to an autoencoder that is trained to encode and decode element-level images. The output of the encoder portion is the second context feature vector. In some implementations, the image of the element may be provided to the pixel-level saliency neural network. In such implementations, the output of the penultimate layer of the pixel-level saliency network may be the second context feature vector. The system thus generates a respective second context feature vector for each element.

In some implementations, the system may also generate, for each element, an intermediate resolution. The intermediate resolution represents an area immediately surrounding the element, but is smaller than the entire content item. In the example of FIG. 8, intermediate resolution 820 includes element 805 and pixels corresponding to an area immediately surrounding element 805. In the example of FIG. 8, the area immediately surrounding element 805 is determined by locating a point mid-way between each edge of element 805 and the corresponding edge in the content item 800. Thus, for example, the area immediately surrounding the left and bottom sides of the element 805 is smaller than the area immediately surrounding the right and top sides because the element 805 is closer to the left and bottom edges of the content item 800. Thus, the immediate area included in the intermediate resolution may be inversely proportional to the original content item dimensions. Similarly, intermediate resolution 825 corresponds to the area immediately surrounding element 810 and intermediate resolution 830 corresponds to the area immediately surrounding element 815. The other elements of the content item 800 would also have corresponding intermediate resolutions. The third context feature vector is generated from an image that includes the pixels corresponding to the intermediate resolution for an element. In some implementations, this image may be resized, as illustrated in FIG. 8, prior to being provided to an autoencoder trained to encode and decode intermediate images and the output of the encoder portion used as the third context feature vector. In some implementations, the image representing the intermediate context may be provided to the pixel-level saliency neural network, similar to the process described above for the content element. In the example of FIG. 8, the context feature vectors may be concatenated prior to providing the context feature vectors to the content saliency neural network.

FIG. 9 illustrates an example saliency map for the content item 800, according to one example. In the example of FIG. 9 the content item 800 includes nine different elements. Accordingly, the saliency map 900 includes nine element areas, each area corresponding to one of the elements. The element areas of the saliency map 900 are laid out based on the location of the corresponding element in the original content item. This layout provides a quick visual correspondence between the areas and the original content item. Each element area in the saliency map has a coloration that corresponds to the saliency code determined by the content saliency neural network using the techniques described herein. In the example of FIG. 9 a lighter coloration corresponds to a higher saliency score for the element. For example, the element area 905 that corresponds to element 805 in content item 800 is light grey, indicating this element is most prominent to readers. In contrast, element areas 910, 940, and 945, which correspond to elements 810, 840, and 845 respectively, have dark coloration, indicating a reader is not likely to pay much attention to these elements in the first n seconds of viewing. If the content creator of content item 800 wants element 805 to be prominent and cares less about elements 810, 840, and 845 then the layout is good. However, if the content creator wants element 810 to be more prominent, the content creator can play with the arrangement, size, and appearance of the elements to ensure that element 810 increases in saliency.

Figure 10:
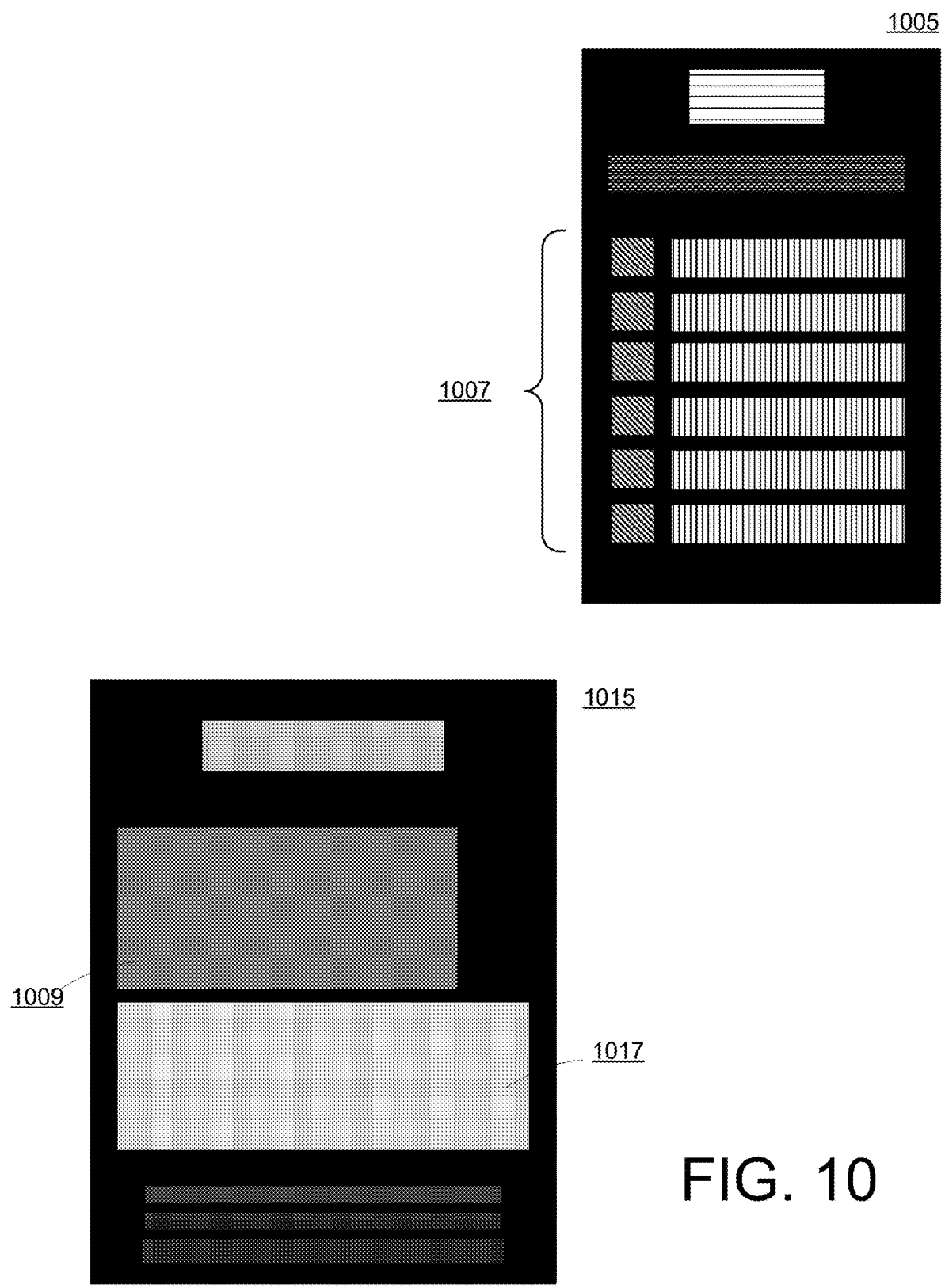
FIG. 10 illustrates additional example saliency maps.

FIG. 10 illustrates additional example saliency maps. In the example of saliency map 1005, elements in the group of elements 1007 represent similarly sized UI elements. All of the elements in the group of elements 1007 have similar salience. If this is not the intent, the content creator may consider changing the layout of the images so that the desired UI elements have greater saliency. In the example of saliency map 1005, the element areas use a pattern to convey saliency. Thus, different colorations include different patterns of the same color. In the saliency map 1005 patterns with the most whitespace between lines have higher saliency than patterns with less white space. In the saliency map 1015, element 1009 has much less saliency than element 1017. If this is not the desire of the content developer, the content developer can play with size, coloration, and position of the element 1009 until it receives the desired level of saliency.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit). Method steps may also be performed in a different order than illustrated in the figures.

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

In one aspect, a computer-implemented method for training a content saliency neural network includes obtaining, using at least one processor, eye gaze data for each of a plurality of mobile application user interface screenshots, wherein the eye gaze data for each screenshot in the plurality of mobile application user interface screenshots includes data from a plurality of viewers of the screenshot and wherein the eye gaze data includes, for each screenshot-viewer pair, a set of coordinates that correspond to a location in the screenshot. The method also includes, for each user interface in the plurality of user interface screenshots, computing a first context vector for the user interface screenshot, the first context vector being an encoded vector generated as output of an encoder portion of an autoencoder. The method also includes for each user interface in the plurality of user interface screenshots, the user interface including a respective set of elements, and for each element in the respective set of elements, determining a saliency score for the element based on the coordinates from the set of coordinates for the user interface screenshot that correspond to the element, computing a vector of simple features for the element, the simple features being computed from attributes of the element, computing a second context vector for the element, the second context vector being an encoded vector generated as output of the encoder portion of an autoencoder given a first portion of the user interface screenshot that represents the element, computing a third context vector for an intermediate context of the element, the third context vector being an encoded vector generated as output of the encoder portion of an autoencoder given a second portion of the user interface screenshot that represents the intermediate context of the element, and training, by the at least one processor, the content saliency neural network to predict the saliency score for the element given the first context vector, the second context vector, the third context vector, and the vector of simple features. The method also includes providing the content saliency neural network for use in generating an element-level saliency map for a user interface under development.

These and other aspects can include one or more of the following features. For example, the autoencoder may be trained on the plurality of mobile application user interface screenshots and/or the autoencoder may be trained using corrupted versions of the plurality of mobile application user interface screenshots, so that the autoencoder is denoised. As another example, determining the saliency score for the element can include computing the integral of pixel-level saliency density over an area covered by the element. As another example, a first autoencoder may generate the first context vector, a second autoencoder may generate the second context vector, and a third autoencoder may generate the third context vector. As another example, the user interface screenshot, the first portion, and the second portion may be resized to a same size prior to being provided to the autoencoder. As another example, the attributes of the element can be selected from a group including position of the element, area of the element, a first color moment in each of three color channels, and a second color moment in each of three color channels. As another example, the eye gaze data may include data obtained from a calibration task.

In one aspect, a computer system comprises at least one processor, memory storing a neural network trained to predict, for a given element of a user interface, a saliency score for the element, and memory storing instructions that, when executed by the at least one processor, causes the computer system to perform operations. The operations may include determining, using the at least one processor, a set of elements in a screenshot of a user interface provided by a requestor and computing a first context vector for the user interface, the first context vector being an encoded vector output by an encoder portion of a first autoencoder provided with a screenshot of the user interface. The operations may also include, for each element in the set of elements, computing a vector of simple features for the element, the simple features being computed from attributes of the element, computing a second context vector for the element, the second context vector being an encoded vector output by an encoder portion of a second autoencoder provided with a first portion of the screenshot that represents the element, computing a third context vector for an intermediate context of the element, the third context vector being an encoded vector output by an encoder portion of a third autoencoder provided with a second portion of the screenshot that is larger than the first portion and smaller than the screenshot, and providing the first context vector, the second context vector, the third context vector, and the vector of simple features to the neural network, the neural network providing a saliency score for the element. The operations may also include normalizing the saliency scores for the elements, generating an element-level saliency map of the user interface using the respective normalized saliency scores for the set of elements, and providing the element-level saliency map to the requestor.

These and other aspects can include one or more of the following features. For example, the first autoencoder may have been trained to encode and decode screenshots of user interfaces, the second autoencoder may have been trained to encode and decode portions of screenshots of user interfaces that represent individual elements of the user interfaces, and the third autoencoder may have been trained to encode and decode portions of screenshots of user interfaces that represent intermediate context for elements of the user interfaces. As another example, providing the first context vector, the second context vector, and the third context vector to the neural network may include concatenating the first context vector, the second context vector, and the third context vector. As another example, the simple features may include an area of the element and a position of the element in the screenshot. As another example, the simple features may include a first color moment for each color channel and a second color moment for each color channel. As another example, the screenshot, the first portion, and the second portion may be resized to a same size prior to being provided to the first autoencoder, the second autoencoder, and third autoencoder respectively. As another example, determining the set of elements includes selecting elements from computer code used to generate the user interface.

According to one aspect, a computer program product embodied on a non-transitory computer-readable storage medium comprises a content saliency neural network and instructions that, when executed by a computing device, are configured to cause the computing device to perform operations. The operations include receiving a screenshot of a user interface from a requestor. The user interface includes a plurality of elements illustrated in the screenshot. The operations also include, for each element of the plurality of elements, generating a vector of simple features from attributes of the element, generating a context vector for each of at least three different zoom levels for the element by providing an image of each zoom level to an autoencoder, the context vector being the output of an encoder portion of the autoencoder, and obtaining, from the content saliency neural network, a respective saliency score for the element, the saliency score being based on the vector of simple features, and the context vector for each of the at least three different zoom levels. The operations may also include generating an element-level saliency map for the user interface based on the respective saliency scores; and providing the element-level saliency map to the requestor.

These and other aspects may include one or more of the following features. For example, the operations may also include determining the plurality of elements based on XML code corresponding to the user interface. As another example, generating an element-level saliency map may include normalizing the respective saliency scores prior to generating the element-level saliency map. As another example, each zoom level has a respective autoencoder, each autoencoder being trained to encode and decode images corresponding to its respective zoom level. In some implementations, the images provided to the respective autoencoders have the same dimensions.

According to one general aspect, a system includes at least one processor and memory storing instructions that, when executed by the at least one processor, cause the system to perform any of the operations or methods disclosed herein.

What is claimed is:

1. A computer-implemented method for training a content saliency neural network, the method comprising:
    obtaining, using at least one processor, eye gaze data for each of a plurality of mobile application user interface screenshots, wherein the eye gaze data for each screenshot in the plurality of mobile application user interface screenshots includes data from a plurality of viewers of the screenshot and wherein the eye gaze data includes, for each screenshot-viewer pair, a set of coordinates that correspond to a location in the screenshot;
    for each user interface screenshot in the plurality of mobile application user interface screenshots, the user interface screenshot including a respective set of elements:
        computing a first context vector for the user interface screenshot, the first context vector being an encoded vector generated as output of an encoder portion of an autoencoder; and
        for each element in the respective set of elements:
            determining a saliency score for the element based on the coordinates from the set of coordinates for the user interface screenshot that correspond to the element,
            computing a vector of simple features for the element, the simple features being computed from attributes of the element,
            computing a second context vector for the element, the second context vector being an encoded vector generated as output of the encoder portion of an autoencoder given a first portion of the user interface screenshot that represents the element,
            computing a third context vector for an intermediate context of the element the third context vector being an encoded vector generated as output of the encoder portion of an autoencoder given a second portion of the user interface screenshot that represents the intermediate context of the element, the second portion being a larger portion of the user interface screenshot than the first portion and smaller than the screenshot, and
            training, by the at least one processor, the content saliency neural network to predict the saliency score for the element given the first context vector, the second context vector, the third context vector, and the vector of simple features; and
    providing the content saliency neural network for use in generating an element-level saliency map for a user interface under development.

2. The method of claim 1, wherein the autoencoder is trained on the plurality of mobile application user interface screenshots.

3. The method of claim 2, wherein the autoencoder is further trained using corrupted versions of the plurality of mobile application user interface screenshots, so that the autoencoder is denoised.

4. The method of claim 1, wherein determining the saliency score for the element includes computing the integral of pixel-level saliency density over an area covered by the element.

5. The method of claim 1, wherein a first autoencoder generates the first context vector, a second autoencoder generates the second context vector, and a third autoencoder generates the third context vector.

6. The method of claim 1, wherein the user interface screenshot, the first portion, and the second portion are resized to a same size prior to being provided to the autoencoder.

7. The method of claim 1, wherein the attributes of the element are selected from a group including position of the element, area of the element, a first color moment in each of three color channels, and a second color moment in each of three color channels.

8. The method of claim 1, wherein the eye gaze data includes data obtained from a calibration task.

9. A computer system comprising:
    at least one processor;
    memory storing a neural network trained to predict, for a given element of a user interface, a saliency score for the element; and
    memory storing instructions that, when executed by the at least one processor, causes the computer system to perform operations including:
        determining, using the at least one processor, a set of elements in a screenshot of a user interface provided by a requestor, computing a first context vector for the user interface, the first context vector being an encoded vector output by an encoder portion of a first autoencoder provided with a screenshot of the user interface, for each element in the set of elements:
computing a vector of simple features for the element, the simple features being computed from attributes of the element,
computing a second context vector for the element, the second context vector being an encoded vector output by an encoder portion of a second autoencoder provided with a first portion of the screenshot that represents the element,
computing a third context vector for an intermediate context of the element, the third context vector being an encoded vector output by an encoder portion of a third autoencoder provided with a second portion of the screenshot that is larger than the first portion and smaller than the screenshot, and
providing the first context vector, the second context vector, the third context vector, and the vector of simple features to the neural network, the neural network providing a saliency score for the element, normalizing the saliency scores for the elements,
generating an element-level saliency map of the user interface using the respective normalized saliency scores for the set of elements, and
providing the element-level saliency map to the requestor.

10. The system of claim 9, wherein the first autoencoder has been trained to encode and decode screenshots of user interfaces, the second autoencoder has been trained to encode and decode portions of screenshots of user interfaces that represent individual elements of the user interfaces, and the third autoencoder has been trained to encode and decode portions of screenshots of user interfaces that represent intermediate context for elements of the user interfaces.

11. The system of claim 9, wherein providing the first context vector, the second context vector, and the third context vector to the neural network includes concatenating the first context vector, the second context vector, and the third context vector.

12. The system of claim 9, wherein the simple features include an area of the element and a position of the element in the screenshot.

13. The system of claim 9, wherein the simple features include a first color moment for each color channel and a second color moment for each color channel.

14. The system of claim 9, wherein the screenshot, the first portion, and the second portion are resized to a same size prior to being provided to the first autoencoder, the second autoencoder, and third autoencoder respectively.

15. The system of claim 9, wherein determining the set of elements includes selecting elements from computer code used to generate the user interface.

16. A computer program product embodied on a non-transitory computer-readable storage medium comprising a content saliency neural network and instructions that, when executed by a computing device, are configured to cause the computing device to:
receive a screenshot of a user interface from a requestor, the user interface including a plurality of elements illustrated in the screenshot;
for each element of the plurality of elements:
generate a vector of simple features from attributes of the element,
generate a context vector for each of at least three different zoom levels for the element by providing an image of each zoom level to an autoencoder, the context vector being the output of an encoder portion of the autoencoder, and
obtain, from the content saliency neural network, a respective saliency score for the element, the saliency score being based on the vector of simple features, and the context vector for each of the at least three different zoom levels;
generate an element-level saliency map for the user interface based on the respective saliency scores; and
provide the element-level saliency map to the requestor.

17. The computer program product of claim 16, wherein the instructions that, when executed by the at least one computing device, are also configured to:
determine the plurality of elements based on XML code corresponding to the user interface.

18. The computer program product of claim 16, wherein generating an element-level saliency map includes normalizing the respective saliency scores prior to generating the element-level saliency map.

19. The computer program product of claim 16, wherein each zoom level has a respective autoencoder, each autoencoder being trained to encode and decode images corresponding to its respective zoom level.

20. The computer program product of claim 19, wherein the images provided to the respective autoencoders have the same dimensions.

* * * * *